US010147222B2

(12) United States Patent
Hakura et al.

(10) Patent No.: US 10,147,222 B2
(45) Date of Patent: Dec. 4, 2018

(54) MULTI-PASS RENDERING IN A SCREEN SPACE PIPELINE

(71) Applicant: NVIDIA CORPORATION, Santa Clara, CA (US)

(72) Inventors: Ziyad Hakura, San Jose, CA (US); Cynthia Allison, Madison, AL (US); Dale Kirkland, Madison, AL (US); Jeffrey Bolz, Cedar Park, CA (US); Yury Uralsky, San Jose, CA (US); Jonah Alben, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 154 days.

(21) Appl. No.: 14/952,390

(22) Filed: Nov. 25, 2015

(65) Prior Publication Data

US 2017/0148203 A1    May 25, 2017

(51) Int. Cl.

| G06T 17/00 | (2006.01) |
|---|---|
| G06T 15/00 | (2011.01) |
| G06T 15/40 | (2011.01) |
| G06T 15/50 | (2011.01) |
| G06T 15/80 | (2011.01) |
| G06T 17/20 | (2006.01) |
| G06T 1/20 | (2006.01) |

(52) U.S. Cl.
CPC .............. *G06T 15/005* (2013.01); *G06T 1/20* (2013.01); *G06T 15/405* (2013.01); *G06T 15/503* (2013.01); *G06T 15/80* (2013.01); *G06T 17/20* (2013.01)

(58) Field of Classification Search
CPC ................................................... G06T 15/005
See application file for complete search history.

(56) References Cited

U.S. PATENT DOCUMENTS

| 5,555,003 A * | 9/1996 | Montgomery | G06F 3/04842 345/545 |
|---|---|---|---|
| 7,170,515 B1 * | 1/2007 | Zhu | G06T 15/005 345/422 |
| 2002/0196251 A1 * | 12/2002 | Duluk, Jr. | G06T 1/60 345/420 |
| 2003/0169269 A1 * | 9/2003 | Sasaki | G06F 9/5066 345/581 |

(Continued)

*Primary Examiner* — Charles Tseng
(74) *Attorney, Agent, or Firm* — Artegis Law Group, LLP

(57) ABSTRACT

A multi-pass unit interoperates with a device driver to configure a screen space pipeline to perform multiple processing passes with buffered graphics primitives. The multi-pass unit receives primitive data and state bundles from the device driver. The primitive data includes a graphics primitive and a primitive mask. The primitive mask indicates the specific passes when the graphics primitive should be processed. The state bundles include one or more state settings and a state mask. The state mask indicates the specific passes where the state settings should be applied. The primitives and state settings are interleaved. For a given pass, the multi-pass unit extracts the interleaved state settings for that pass and configures the screen space pipeline according to those state settings. The multi-pass unit also extracts the interleaved graphics primitives to be processed in that pass. Then, the multi-pass unit causes the screen space pipeline to process those graphics primitives.

20 Claims, 22 Drawing Sheets

(56) References Cited

U.S. PATENT DOCUMENTS

| | | | | |
|---|---|---|---|---|
| 2005/0122338 A1* | 6/2005 | Hong | .................... | G06T 15/405 345/546 |
| 2006/0139365 A1* | 6/2006 | Naoi | .................... | G06T 15/005 345/582 |
| 2007/0165042 A1* | 7/2007 | Yagi | .................... | G06T 15/005 345/557 |
| 2011/0063294 A1* | 3/2011 | Brown | ................. | G06T 15/005 345/423 |
| 2013/0293543 A1* | 11/2013 | Jeong | ................... | G06T 15/005 345/423 |
| 2014/0118380 A1* | 5/2014 | Hakura | ................ | G06T 15/005 345/557 |

* cited by examiner

Cachetile 0: PASS 0:

| Sent: | P0 | S0' | S1' | P1 | S2' | S3' | S4' | P2 | P3 | P4 | P5 |
|---|---|---|---|---|---|---|---|---|---|---|---|
| Dirty Bits (S6-S0) in Hex | 0x1 | 0x3 | | | 0x7 | 0xF | 0x1F | | | | |
| | S0 | S0 S1 | | | S0 S1 S2 | S0 S1 S2 S3 | S0 S1 S2 S3 S4 | | | | |

600(0-0)

Dirty State Sent in Preparation for Pass 1

| Sent: | S0 | S1 | S2 | S3 | S4 |
|---|---|---|---|---|---|

| P5 | S1" | S6 |   |   | P4 | P3 |   |   | S5' | S4" |   |   |   | S4' | S3' | S2' |   |   | P1 | S1' | S0' |   |   | P0 |   |
|----|-----|----|---|---|----|----|---|---|-----|-----|---|---|---|-----|-----|-----|---|---|----|-----|-----|---|---|----|---|
|    |     |    | 0 | 0 | 0  | 1  |   |   |     |     | 1 | 0 | 1 | 1   |     |     | 0 | 0 | 1  | 0   |     |   |   |    | S0, S1, S2, S3, S4, S5, S6 Sent sometime prior to the start of the buffer |
|    |     |    | SM 614(3) | | | | | | | | PM 612(2) | | | | | | SM 614(2) | | | | | PM 612(1) | | | | SM 614(1) | | | | SM 614(0) | | | | PM 612(0) | |

← API ORDER

520

Cachetile 0: PASS 3:

| Sent: | P0 | S0' | S1' | P1 | S4" | S5' | P3 | P4 | S6' | S1" | P5 |
|-------|----|----|-----|----|-----|-----|----|----|-----|-----|----|
| Dirty Bits (S6-S0) in Hex | | 0x3F | 0x3F | | 0x3F | 0x3F | | | 0x7F | 0x7F | |
| | | S0 | S0 | | S0 | S0 | | | S0 | S0 | |
| | | S1 | S1 | | S1 | S1 | | | S1 | S1 | |
| | | S2 | S2 | | S2 | S2 | | | S2 | S2 | |
| | | S3 | S3 | | S3 | S3 | | | S3 | S3 | |
| | | S4 | S4 | | S4 | S4 | | | S4 | S4 | |
| | | S5 | S5 | | S5 | S5 | | | S5 | S5 | |
| | | | | | | | | | S6 | S6 | |

600(0-3)

Send Dirty State in Preparation for CacheTile 1: Pass 0

| Sent: | S0 | S1 | S2 | S3 | S4 | S5 | S6 |
|-------|----|----|----|----|----|----|----|

| P5 | S1" | S6' | P4 | P3 | | | S5' | S4" | | | P2 | S3' | S2' | | | P1 | S1' | S0' | | | P0 | | | |
|---|---|---|---|---|---|---|---|---|---|---|---|---|---|---|---|---|---|---|---|---|---|---|---|---|
| | | | | | 0 | 0 | | | 1 | 0 | | | | 0 | 0 | | | | 1 | 1 | | | 1 | 1 |
| | | | | | 0 | 0 | | | 0 | 0 | | | | 0 | 0 | | | | 1 | 1 | | | 1 | 1 |
| | | | | | 0 | 0 | | | 1 | 1 | | | | 1 | 0 | | | | 0 | 0 | | | 1 | 1 |
| | | | | | 1 | 1 | | | 1 | 1 | | | | 0 | 0 | | | | 0 | 0 | | | 1 | 1 |
| | | | | | SM 614(3) | | | | PM 612(2) | | | | | SM 614(2) | | | | | SM 614(1) | | | | SM 614(0) | PM 612(0) |

S0, S1, S2, S3, S4, S5, S6 Sent sometime prior to the start of the buffer

◄─── API ORDER

Cachetile 1: PASS 0:

| Sent: | P0 | S0' | S1' | P1 | S2' | S3' | S4' |
|---|---|---|---|---|---|---|---|
| Dirty Bits (S6-S0) in Hex | | 0x7F S0 S1 S2 S3 S4 S5 S6 | 0x7F S0 S1 S2 S3 S4 S5 S6 | | 0x7F S0 S1 S2 S3 S4 S5 S6 | 0x7F S0 S1 S2 S3 S4 S5 S6 | 0x7F S0 S1 S2 S3 S4 S5 S6 |

600(1-0)

| P2 | P3 | P4 | P5 |
|---|---|---|---|
| | | | |

Send Dirty State in Preparation for Pass 1

| Sent: | S0 | S1 | S2 | S3 | S4 | S5 | S6 |
|---|---|---|---|---|---|---|---|

520 — S0, S1, S2, S3, S4, S5, S6 Sent sometime prior to the start of the buffer

API ORDER ↓

| P5 | S1" | S6' | | | | | P4 | P3 | | | | | P2 | | | | | P1 | | | | | P0 | | | | |
|----|-----|-----|--|--|--|--|----|----|--|--|--|--|----|--|--|--|--|----|--|--|--|--|----|--|--|--|--|
|    |     |     | 0 | 0 | 0 | 1 | S5' | S4" | 1 | 0 | 1 | 1 | S4' | 0 | 0 | 1 | 0 | S3' | S2' | 1 | 1 | 0 | 0 | S1' | S0' | 1 | 1 | 1 | 1 |
|    |     |     | SM 614(3) | | | | PM 612(2) | | | | | | SM 614(2) | | | | | SM 614(1) | | | | | SM 614(0) | | | | | PM 612(0) | | | | |

Cachetile 1: PASS 3:

600(1-3)

| Sent: | P0 | S0' | S1' | P1 | S4" | S5' | P3 | P4 | S6' | S1" | P5 |
|-------|-----|------|------|------|------|------|-----|-----|------|------|-----|
| Dirty Bits (S6–S0) in Hex | | 0x7E<br>S1<br>S2<br>S3<br>S4<br>S5<br>S6 | 0x7C<br>S2<br>S3<br>S4<br>S5<br>S6 | | 0x7C<br>S2<br>S3<br>S4<br>S5<br>S6 | 0x7C<br>S2<br>S3<br>S4<br>S5<br>S6 | | | 0x7C<br>S2<br>S3<br>S4<br>S5<br>S6 | 0x7E<br>S1<br>S2<br>S3<br>S4<br>S5<br>S6 | |

Starting State Values for Subsequent Replay:

Pass 0: S0', S1', S2', S3', S4', S5, S6
Pass 1: S0', S1', S2', S3', S4", S5, S6
Pass 2: S0', S1', S2, S3, S4", S5', S6
Pass 3: S0', S1", S2, S3, S4, S5, S6'

MULTI-PASS RENDERING IN A SCREEN SPACE PIPELINE

BACKGROUND OF THE INVENTION

Field of the Invention

Embodiments of the present invention relate generally to graphics processing and, more particularly, to multi-pass rendering in a screen space pipeline.

Description of the Related Art

A conventional graphics processing unit (GPU) includes one or more graphics pipelines that may be configured to generate geometry within a three-dimensional (3D) scene. A given graphics pipeline may draw geometry in the graphics scene in a particular order relative to a viewing position from which the scene is ultimately rendered. For example, a graphics pipeline could generate geometry associated with the background of the scene, relative to the viewing position, and then subsequently generate geometry associated with the foreground of the scene. In this example, the scene geometry is generated "back to front." The order in which the geometry is generated is typically controlled by a software application that relies on the GPU for graphics processing operations. This order is known in the art as application programming interface (API) order. The software application could be, for example, a video game or a 3D simulation program that executes on the computer system that is responsible for rendering the images of the 3D scene for display.

In the graphics pipeline, after the geometry is generated, hardware or software shaders are usually executed to generate pixel values based on the geometry in the 3D scene. The shaders typically operate on the geometry according to the API order with which the geometry was initially generated. Thus, returning to the above example, the shader would generate pixel values for the background of the 3D scene and then generate pixel values for the foreground of the 3D scene. However, inefficiencies may arise with this approach when elements of the foreground occlude portions of the background, making those portions invisible from the viewing position. In particular, any pixel values generated based on the occluded portions of the geometry do not contribute to the final rendered image, so the work expended to generate those pixel values is wasted.

One solution to this problem is to program the GPU, via the software application, to perform an operation known as a "Z pre-pass." When performing a Z pre-pass operation, the graphics pipeline renders only the positions associated with the geometry and then performs a depth test across all resulting pixels or samples to identify occluded pixels and sample that are occluded. The graphics pipeline may then ignore the occluded pixels or samples when performing subsequent shading operations. Although this approach avoids performing shading operations related to occluded geometry, the approach requires the entire 3D scene to be rendered twice, which results in additional processing overhead.

For example, operations such as vertex attribute fetch, vertex shading, and vertex tessellation must be performed twice in order to render the scene for the Z pre-pass and then again for the subsequent shading pass. These operations require additional processing cycles and consume additional power. In particular, vertex attribute fetch operations generally require access to off-chip dynamic random access memory (DRAM), which can be quite costly from a power perspective. Graphics primitives also must be obtained from memory for each rendering. Performing such operations consumes memory bandwidth and also increases load on the central processing unit (CPU), which likewise increases power consumption.

Power considerations are becoming ever more important across all types of computer system implementations, but have already become especially important in mobile implementations, given that mobile devices have limited power resources. Therefore, to the extent possible, unnecessary operations that lead to additional processing cycles and power consumption, like those described above with respect to occluded geometry, should be avoided where possible.

As the foregoing illustrates, what is needed are more effective techniques for rendering graphics scenes that include occluded geometry.

SUMMARY OF THE INVENTION

One embodiment of the present invention sets forth a graphics subsystem for processing graphics primitives, the subsystem including a screen space pipeline configured to process graphics primitives in multiple passes, and a multi-pass unit that includes a buffer and is configured to extract a first graphics primitive from a first portion of the buffer for processing in a first pass through the screen space pipeline, and extract the first graphics primitive from the first portion of the buffer for processing in a second pass through the screen space pipeline.

At least one advantage of the techniques described herein is that the screen space pipeline can be configured to perform various Z passes with buffered primitives and then subsequently perform color shading passes with those same buffered primitives. Thus, certain types of graphics scenes can be rendered correctly without the need to re-fetch graphics data from memory. These techniques may reduce power consumption and therefore improve battery life of mobile devices.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 6A-6H are exemplary illustrations of how the multi-pass (MP) unit of FIG. 5 generates pass data for configuring the screen space pipeline of FIG. 3B, according to one embodiment of the present invention;

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
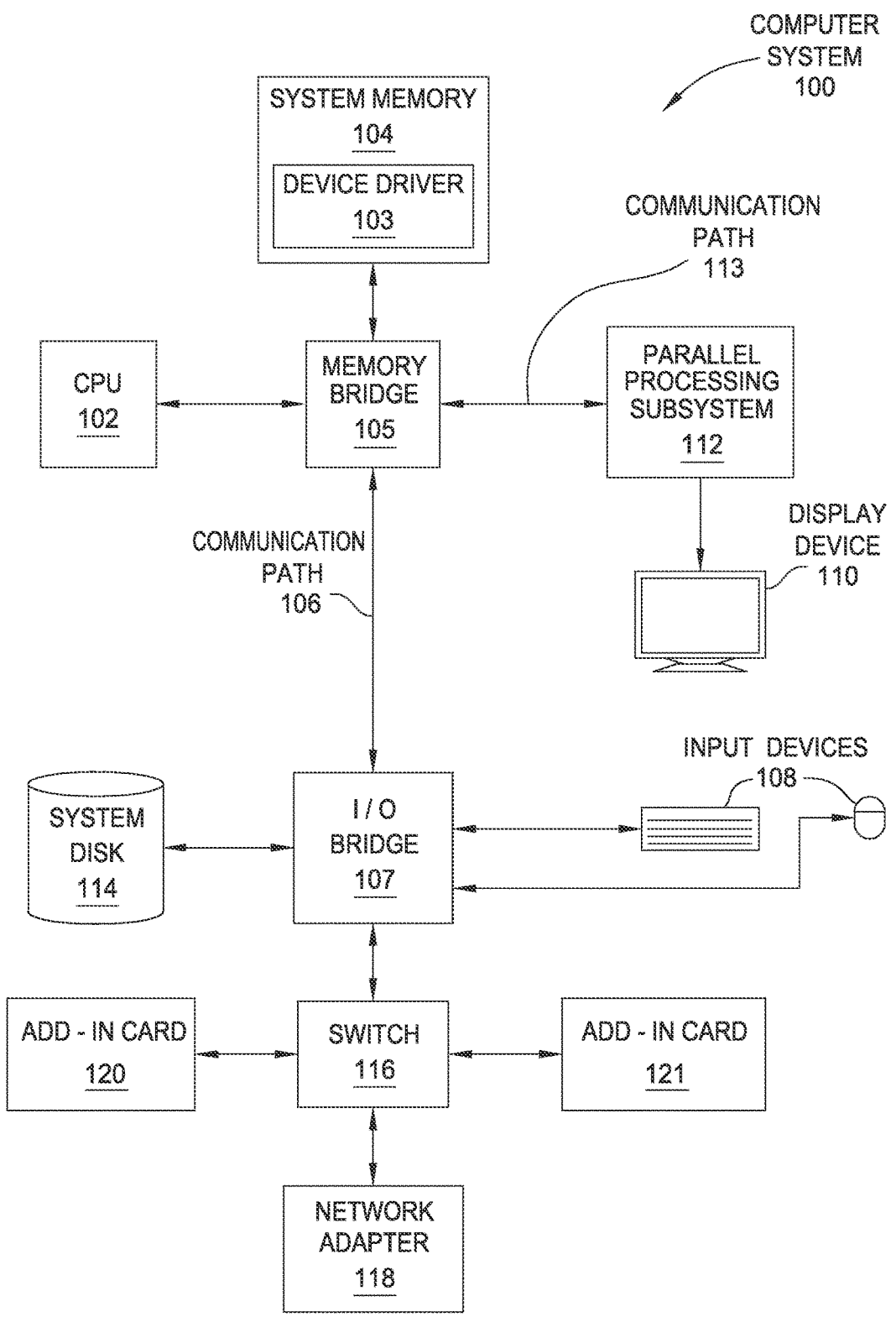
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
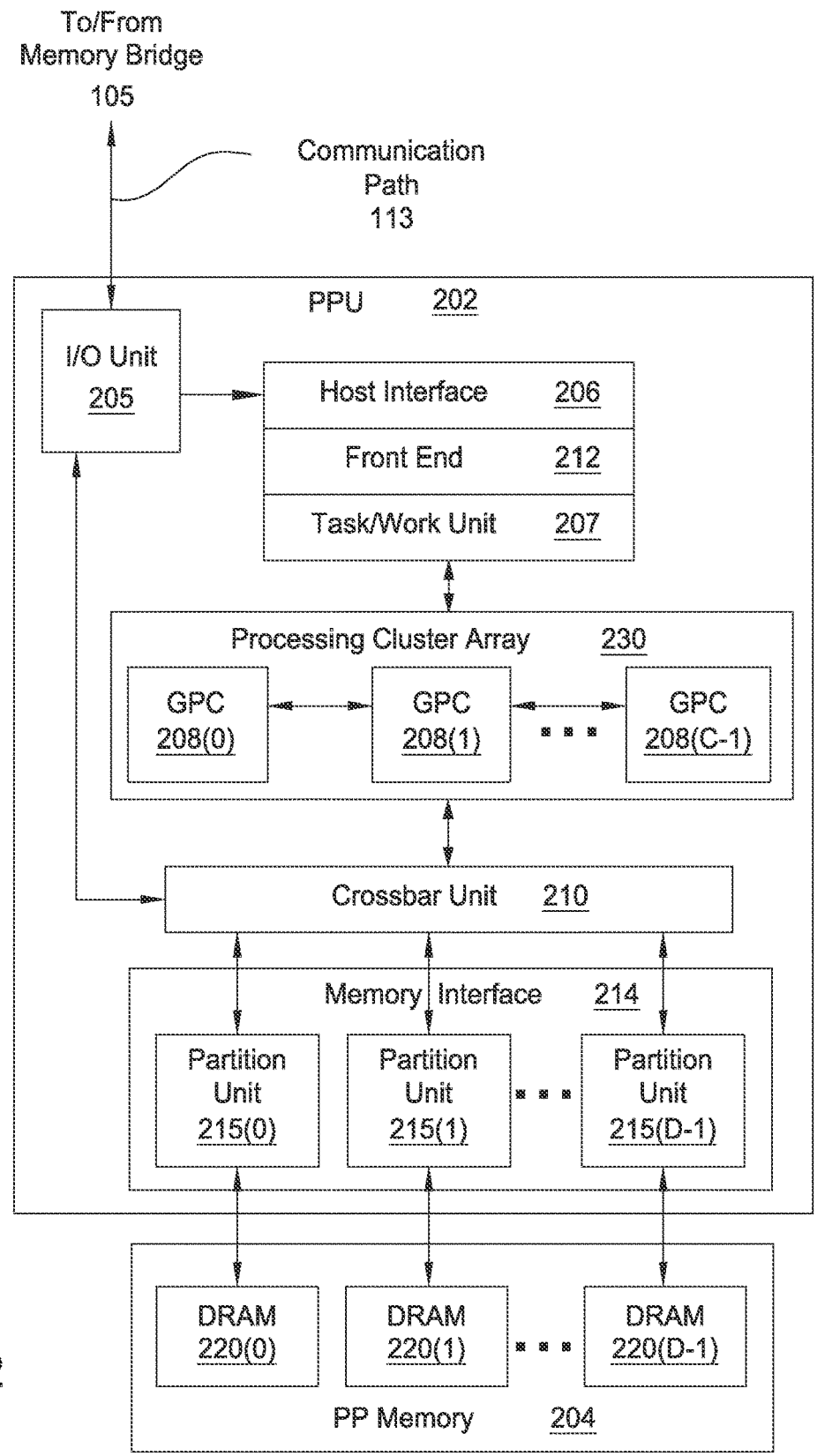
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
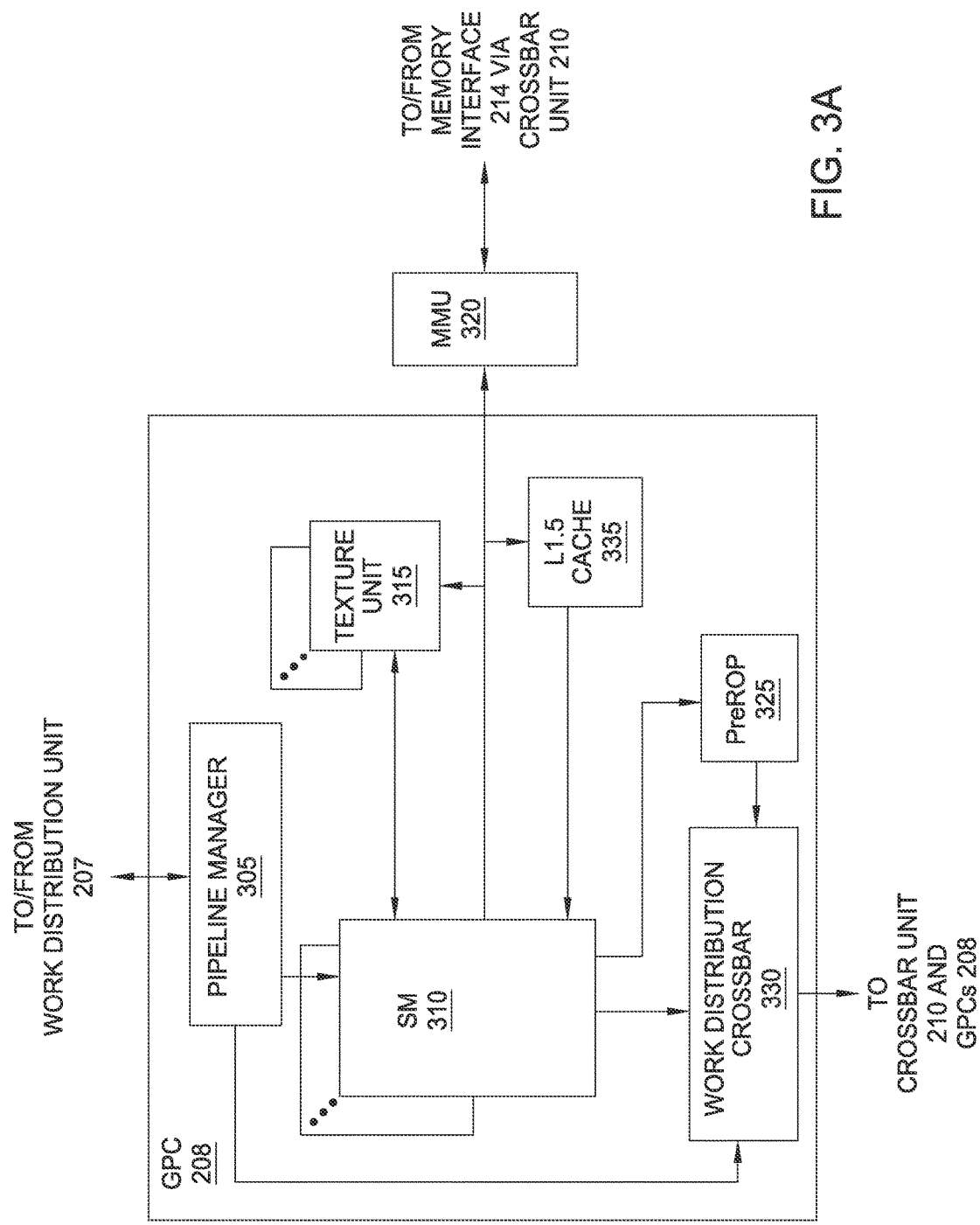
FIG. 3A is a block diagram of a general processing cluster included in the parallel processing unit of FIG. 2, according to one embodiment of the present invention.

FIG. 3A is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Graphics Pipeline Architecture

Figure 3B:
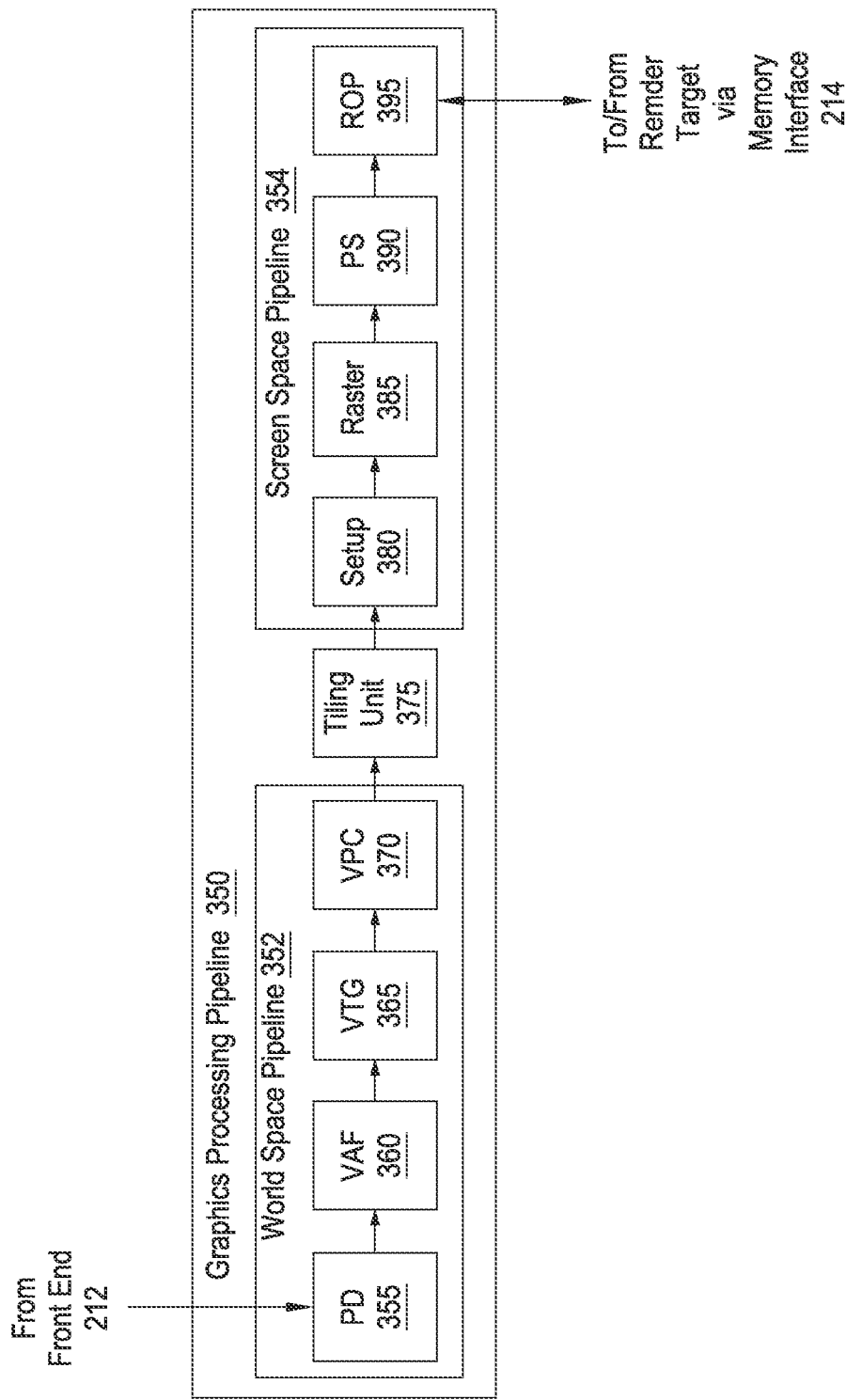
FIG. 3B is a conceptual illustration of a graphics processing pipeline that may be implemented within the parallel processing unit of FIG. 2, according to one embodiment of the present invention.

FIG. 3B is a conceptual illustration of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360, and produce graphics primitives, as well as color values, surface normal vectors, and transparency values at each vertex for the graphics primitives for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, perspective correction, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, edge equations, partial plane equations, and depth plane equations. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, one of the SMs 310 of FIG. 3A could be configured to perform the functions of one or more of the VTG 365 and the pixel shading unit 390. The functions of the PD 355, the VAF 360, the VPC 450, the tiling unit 375, the setup unit 380, the rasterizer 385, and the ROP 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP 395. The tiling unit 375 would follow the last stage of the world space pipeline 352, namely, the VPC 370. The tiling unit 375 would precede the first stage of the screen space pipeline 354, namely, the setup unit 380.

As described in greater detail below in conjunction with FIGS. 5-13, the tiling unit 375 may include a multi-pass unit that is configured to buffer graphics primitive data for multiple passes through the screen space pipeline 354. The graphics primitive data may include graphics primitives or primitive indices that identify different graphics primitives in memory. The multi-pass unit may configure screen space pipeline 354 differently for each pass based on state bundles provided by device driver 103. In this fashion, device driver 103 and the multi-pass unit interoperate to coordinate multiple passes through the screen space pipeline 354. With this approach, certain types of rendering scenarios may be improved, as described in greater detail below in conjunction with FIGS. 5-13.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

As used herein, references to shared memory may include any one or more technically feasible memories, including, without limitation, a local memory shared by one or more SMs 310, or a memory accessible via the memory interface 214, such as a cache memory, parallel processing memory 204, or system memory 104. As also used herein, references to cache memory may include any one or more technically feasible memories, including, without limitation, an L1 cache, an L1.5 cache, and the L2 caches.

Tiled Caching

Figure 4:
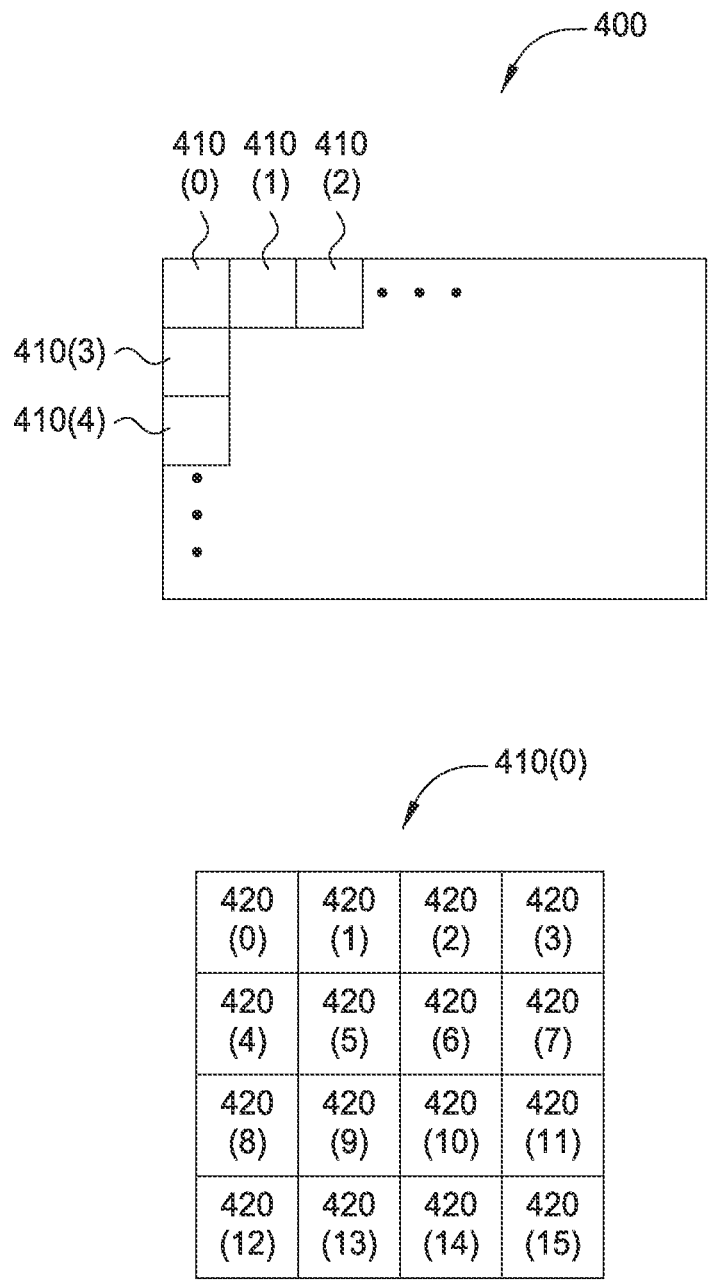
FIG. 4 is a conceptual illustration of a cache tile that the graphics processing pipeline of FIG. 3B may be configured to generate and process, according to one embodiment of the present invention.

FIG. 4 is a conceptual illustration of a cache tile 410(0) that the graphics processing pipeline 350 of FIG. 3B may be configured to generate and process, according to one embodiment of the present invention. As shown, the cache tile 410(0) represents a portion of a screen space 400 and is divided into multiple raster tiles 420.

The screen space 400 represents one or more memory buffers configured to store rendered image data and other data transmitted by functional units within the graphics processing pipeline 350. In some embodiments, the one or more memory buffers may be configured as one or more render targets. The screen space represents a memory buffer configured to store the image rendered by the graphics processing pipeline. The screen space 400 may be associated with any number of render targets, where each render target may be configured independently of other render targets to include any number of fields. Each field within a render target may be configured independently of other fields to include any number of bits. Each render target may include multiple picture elements (pixels), and each pixel may, in turn, include multiple samples. In some embodiments, the size of each cache tile may be based on the size and configuration of the render targets associated with the screen space. In operation, once rendering completes, the pixels in the one or more render targets may be transmitted to a display device in order to display the rendered image.

By way of example, a set of render targets for the screen space 400 could include eight render targets. The first render target could include four fields representing color, including red, green, and blue component colors, and transparency information associated with a corresponding fragment. The second render target could include two fields representing depth and stencil information associated with the corresponding fragment. The third render target could include three fields representing surface normal vector information, including an x-axis normal vector, a y-axis normal vector, and a z-axis normal vector, associated with the corresponding fragment. The remaining five render targets could be configured to store additional information associated with the corresponding fragment. Such configurations could include storage for various information, including, without limitation, 3D positional data, diffuse lighting information, and specular lighting information.

Each cache tile 410 represents a portion of the screen space 400. For clarity, only five cache tiles 410(0)-410(4) are shown in FIG. 4. In some embodiments, cache tiles may have an arbitrary size in X and Y screen space. For example, if a cache tile were to reside in a cache memory that also is used to store other data, then the cache tile could be sized to consume only a specific portion of the cache memory. The size of a cache tile may be based on a number of factors, including, the quantity and configuration of the render targets associated with the screen space 400, the quantity of samples per pixel, and whether the data stored in the cache tile is compressed. As a general matter, a cache tile is sized to increase the likelihood that the cache tile data remains resident in the cache memory until all graphics primitives associated with the cache tile are fully processed.

The raster tiles 420 represent a portion of the cache tile 410(0). As shown, the cache tile 410(0) includes sixteen raster tiles 420(0)-420(15) arranged in an array that is four raster tiles 420 wide and four raster tiles 420 high. In systems that include multiple GPCs 208, processing associated with a given cache tile 410(0) may be divided among the available GPCs 208. In the example shown, if the sixteen raster tiles of cache tile 410(0) were processed by four different GPCs 208, then each GPC 208 could be assigned to process four of the sixteen raster tiles 420 in the cache tile 410(0). Specifically, the first GPC 208 could be assigned to process raster tiles 420(0), 420(7), 420(10), and 420(13). The second GPC 208 could be assigned to process raster tiles 420(1), 420(4), 420(11), and 420(14). The third GPC 208 could be assigned to process raster tiles 420(2), 420(5), 420(8), and 420(15). The fourth GPC 208 would then be assigned to process raster tiles 420(3), 420(6), 420(9), and 420(12). In other embodiments, the processing of the different raster tiles within a given cache tile may be distributed among GPCs 208 or any other processing entities included within computer system 100 in any technically feasible manner.

Multi-Pass Rendering Techniques

Figure 5:
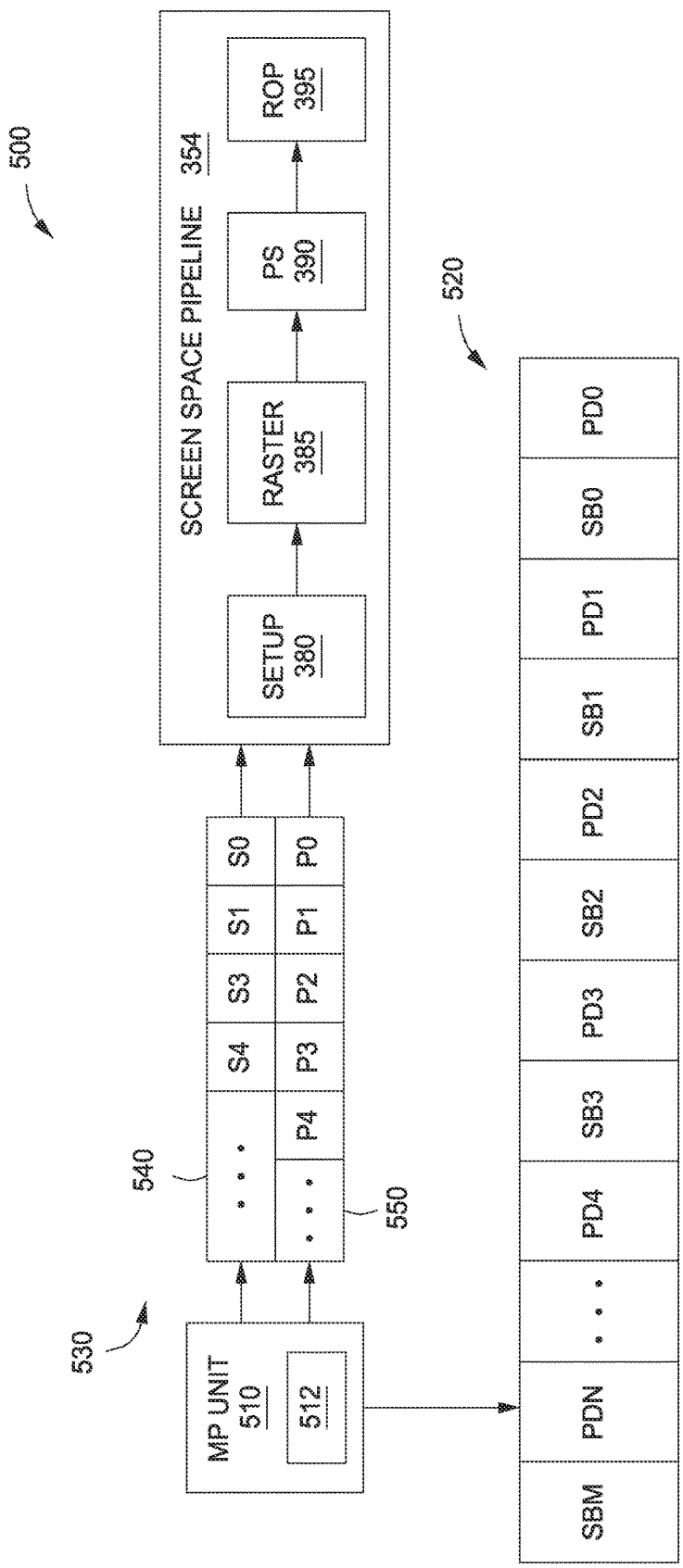
FIG. 5 illustrates a portion of the graphics processing pipeline of FIG. 3B configured to process primitive data in multiple passes, according to one embodiment of the present invention.

FIG. 5 illustrates a portion of the graphics processing pipeline of FIG. 3B configured to process primitive data in multiple passes, according to one embodiment of the present invention. As shown, portion 500 includes a multi-pass (MP) unit 510 that resides upstream of screen space pipeline 354. MP unit 510 may reside within tiling unit 375 shown in FIG. 3B. MP unit 510 is coupled to a buffer 520 that is configured to store primitive data and state bundles. The data stored in buffer 520 generally corresponds to one or more cache tiles. In one embodiment, buffer 520 is a random access memory (RAM) unit. Buffer 520 includes primitive data PD0 through PDN, as is shown. As described in greater detail below, each primitive data in buffer 520 includes a graphics primitive or graphics primitive indices, and a primitive mask. Buffer 520 also includes state bundles SB0 through SBM, as shown. Each state bundle in buffer 520 includes one or more state settings, and a state mask, as also described below.

MP unit 510 is configured to perform one or more traversals of buffer 520 in order to process some or all of the primitive data stored therein during one or more corresponding passes through screen space pipeline 354. For each such pass, MP unit 510 configures screen space pipeline 354 based on specific state bundles in buffer 520. Thus, screen space pipeline 354 may be configured differently for each different pass. In addition, for each different pass, MP unit 510 may transmit different subsets of graphics primitives extracted from buffer 520 to screen space pipeline 354 for processing.

MP unit 510 includes a pass mask 512 that indicates the number of passes to be performed and the current pass number. The number of bits in pass mask 512 reflects the number of passes to be performed. Each bit of pass mask 512 corresponds to a different pass number. When MP unit 510 performs a particular pass, having a specific pass number, the corresponding bit in pass mask 512 is set to 1. For example, pass mask 512 could be a 4-bit mask, indicating that four passes will be performed. Each different bit of the 4-bit pass mask would correspond to a different pass number. Thus, a pass mask of 0001 would indicate that the current pass is pass 0, or, alternatively, a pass mask of 0100 would indicate that the current pass is pass 2. When traversing buffer 520, MP unit 510 relies on pass mask 512 in order to filter out primitive data and state bundles that are relevant to the current pass.

Each primitive data stored in buffer 520, such as PD0 or PD1, includes a graphics primitive or graphics primitive indices, as well as a primitive mask, as mentioned above. The primitive mask indicates the particular passes through the screen space pipeline 354 during which the graphics primitive should be processed. The primitive mask is generally of equal size to pass mask 512. Returning to the above example, when MP unit 510 is configured to perform four passes, and thus relies on a 4-bit pass mask 512, each primitive mask within the various primitive data would likewise be a 4-bit mask. Each bit of the primitive mask would indicate whether the associated graphics primitive should be processed during the corresponding pass numbers. For example, a primitive mask of 0011 would indicate that the graphics primitive should be processed during pass 0 and pass 1, but not during pass 2 and pass 3.

Each state bundle stored in buffer 520, such as SB0 or SB1, includes one or more state settings, and a state mask, as also mentioned above. Each state setting generally reflects the configuration of a particular state of screen space pipeline 354. For example, a state of screen space pipeline 354 could generally reflect a depth function to use, and a state setting for that state could be a specific depth function to be executed by ROP 395. Another state could be a depth buffer state, and a corresponding state setting could reflect that the depth buffer is disabled. Persons skilled in the art will understand that "state" is a broad term meant to capture a general configurable feature of the screen space pipeline 354, and that a "state setting" represents a specific configuration of that feature.

The state mask within a given state bundle indicates the particular passes through the screen space pipeline 354 that should be performed based on the state settings within that state bundle. The state mask is generally of equal size to pass mask 512. Returning to the above example, when MP unit 510 is configured to perform four passes, and thus relies on a 4-bit pass mask 512, each state mask within the different state bundles would likewise be a 4-bit mask. Each bit of a given state mask indicates whether the associated state settings should be used to configure the screen space pipeline 354 during the corresponding pass numbers. For example, a state mask of 0101 would indicate that the state settings associated with that mask should be used to configure screen space pipeline 354 during passes 0 and 2, but not during passes 1 and 3. Each state bundle generally includes one state mask and any number of different state settings. The primitives and state settings associated with a particular pass may be referred to as residing within a "bucket" corresponding to the particular pass. In operation, MP unit 510 may filter out primitives and state settings for placement into a bucket when processing a particular pass.

In one embodiment, the state settings implemented for each pass do not have a one-to-one relationship with each bit of the pass mask, in the fashion described above. Specifically, when device driver 103 configures the pass mask, device driver 103 can also assign which state buckets are processed with each pass. For example, when configured for two passes, MP unit 510 could state bucket 1 for pass 0, and use state bucket 0 for pass 1. This type of indirection may be applied so that "steady-state" processing may be set up using state bucket 0 and then special "pre-processing" could be set up using state bucket 1. Then, MP unit 510 may perform two passes using state bucket 1 (pre-processing state) followed then by state bucket 0 (steady-state processing).

In operation, for a given pass through screen space pipeline 354, MP unit 510 generates pass data 530 that includes both state settings 540 that will be used to configure screen space pipeline 354 for the current pass, and primitives 550 that will be processed during the current pass. MP unit 510 may then configure screen space pipeline 354 based on state settings 540, and then process primitives 550 using the configured screen space pipeline 354. For subsequent passes, MP unit 510 may perform an analogous operation. However, since pass mask 512 differs based on the current pass number, the specific state settings 540 and primitives 550 extracted from buffer 520 for the subsequent pass may differ compared to the previous pass. With this approach, graphics processing pipeline 350 is capable of processing primitive data multiple times and with different configurations of screen space pipeline 354, without needing to fetch graphics primitives from memory multiple times. In various embodiments, graphics processing pipeline 350 may fetch the graphics primitives from L2 cache multiple times without needing to fetch those primitives from system memory multiple times.

Device driver 103 shown in FIG. 1 is generally configured to manage the overall operation of MP unit 510. In doing so, device driver 103 may populate buffer 520 with primitive data and state bundles that enable more efficient types of rendering to be performed. This functionality may ease the burden of programming from application developers. For example, device driver 103 could configure MP unit 510 to perform two passes of buffer 520. In pass 0, device driver 103 would configure MP unit 510 to implement a Z-only pass. During this pass, MP unit 510 could perform a depth test and determine which graphics primitives should be shaded. In pass 1, device driver 103 would configure MP unit 510 to implement a Z+color pass. During this pass, MP unit 510 would perform Z operations, as needed, and then also perform color shading. With this approach, rendering efficiency may be improved, especially in the context of back to front rendering. In particular, background primitives occluded by foreground primitives would not be shaded in the second pass. Further, the graphics primitives would not need to be fetched from memory when performing additional passes, because those primitives would be buffered within buffer 520. The techniques described thus far are also described, by way of example, below in conjunction with FIGS. 6A-6H.

Figure 6B:
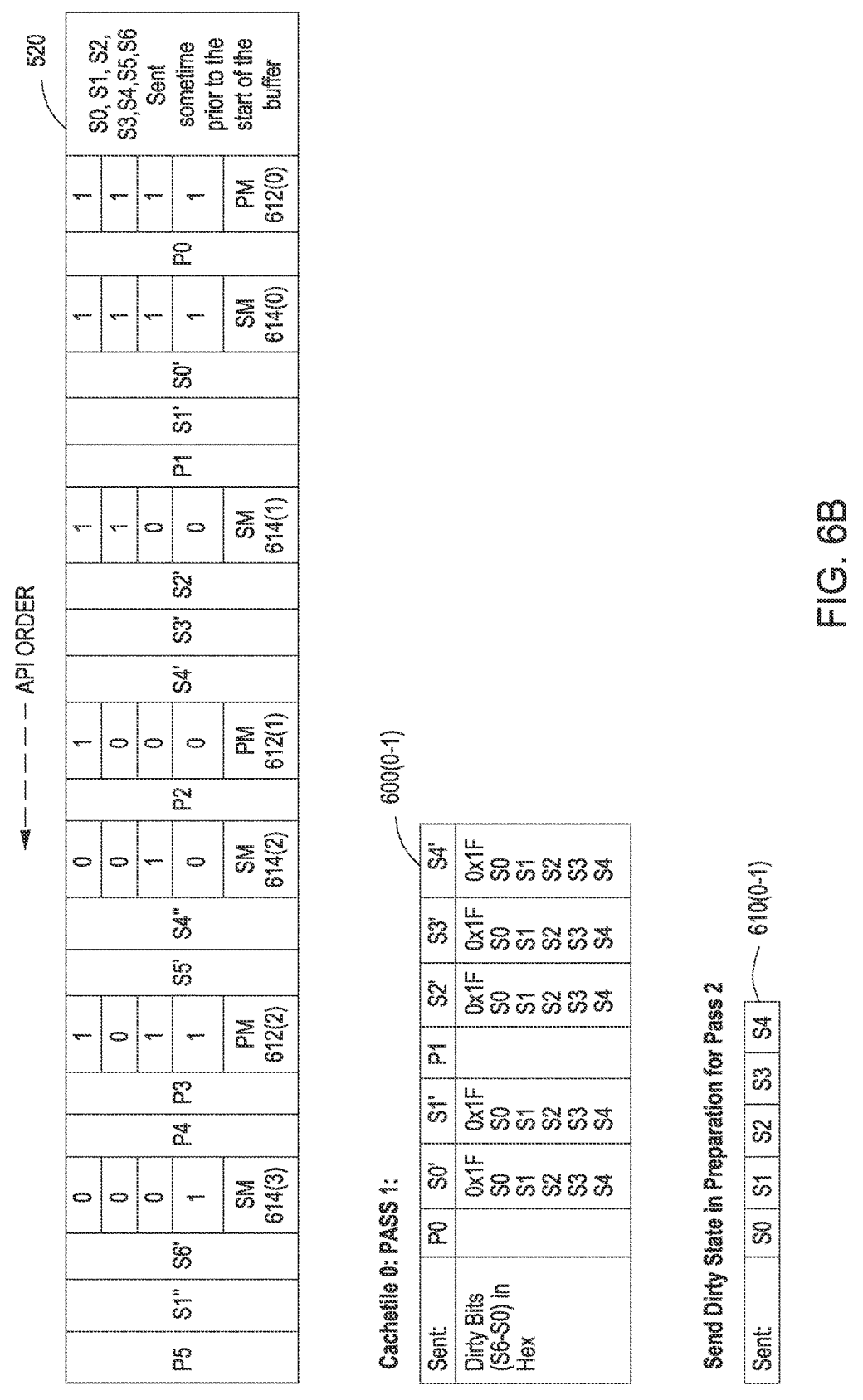
Figure 6C:
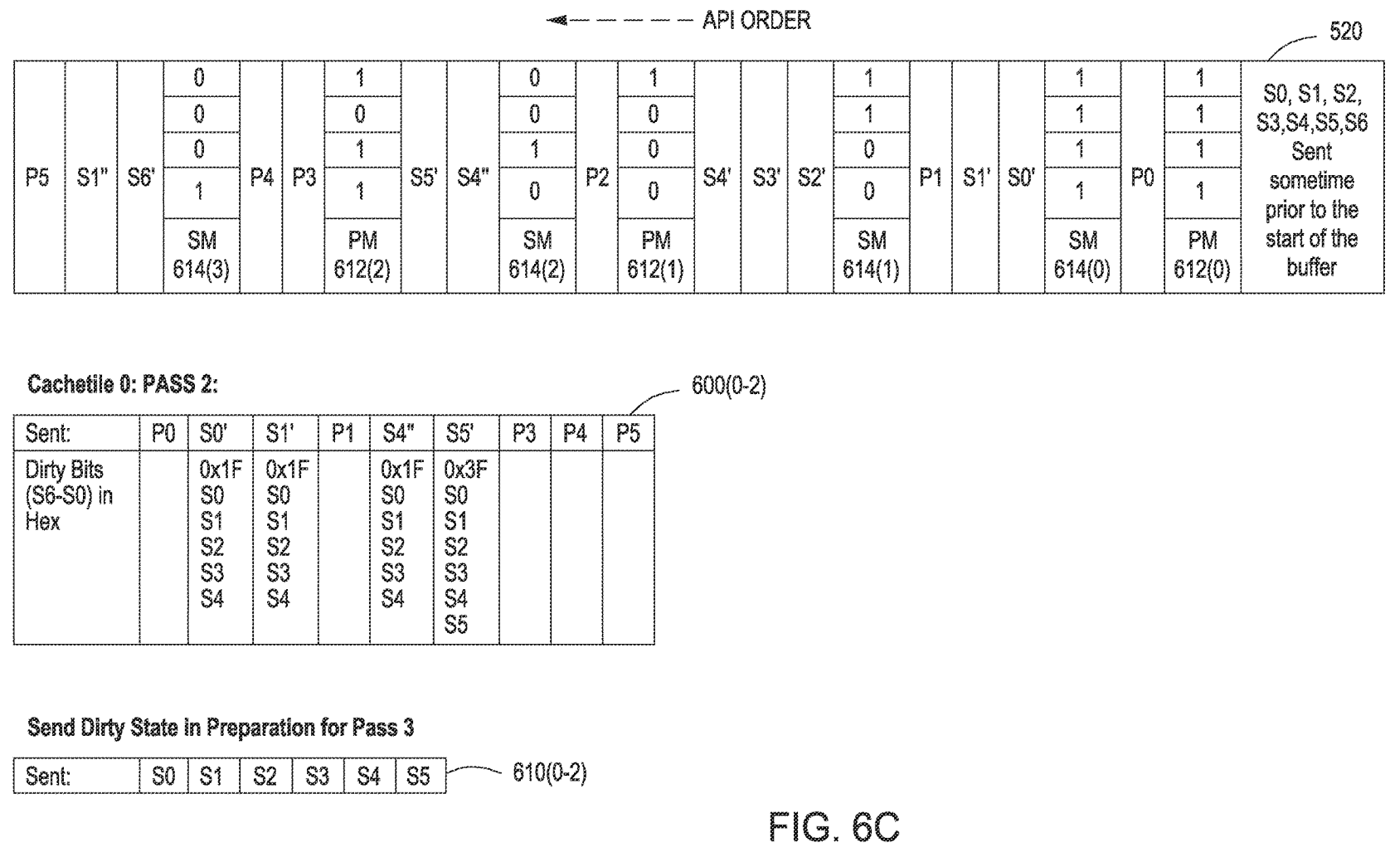
Figure 6F:
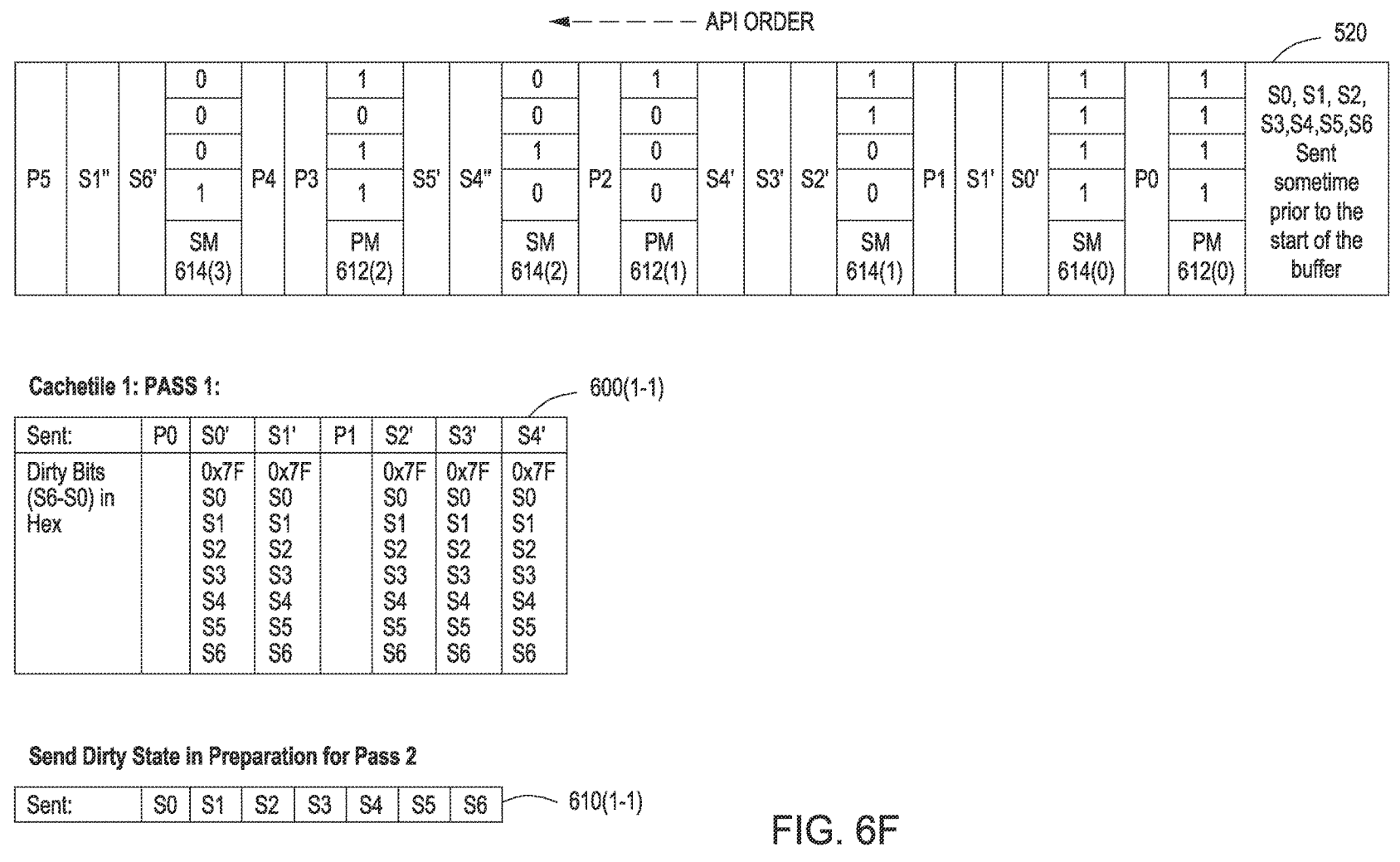
Figure 6G:
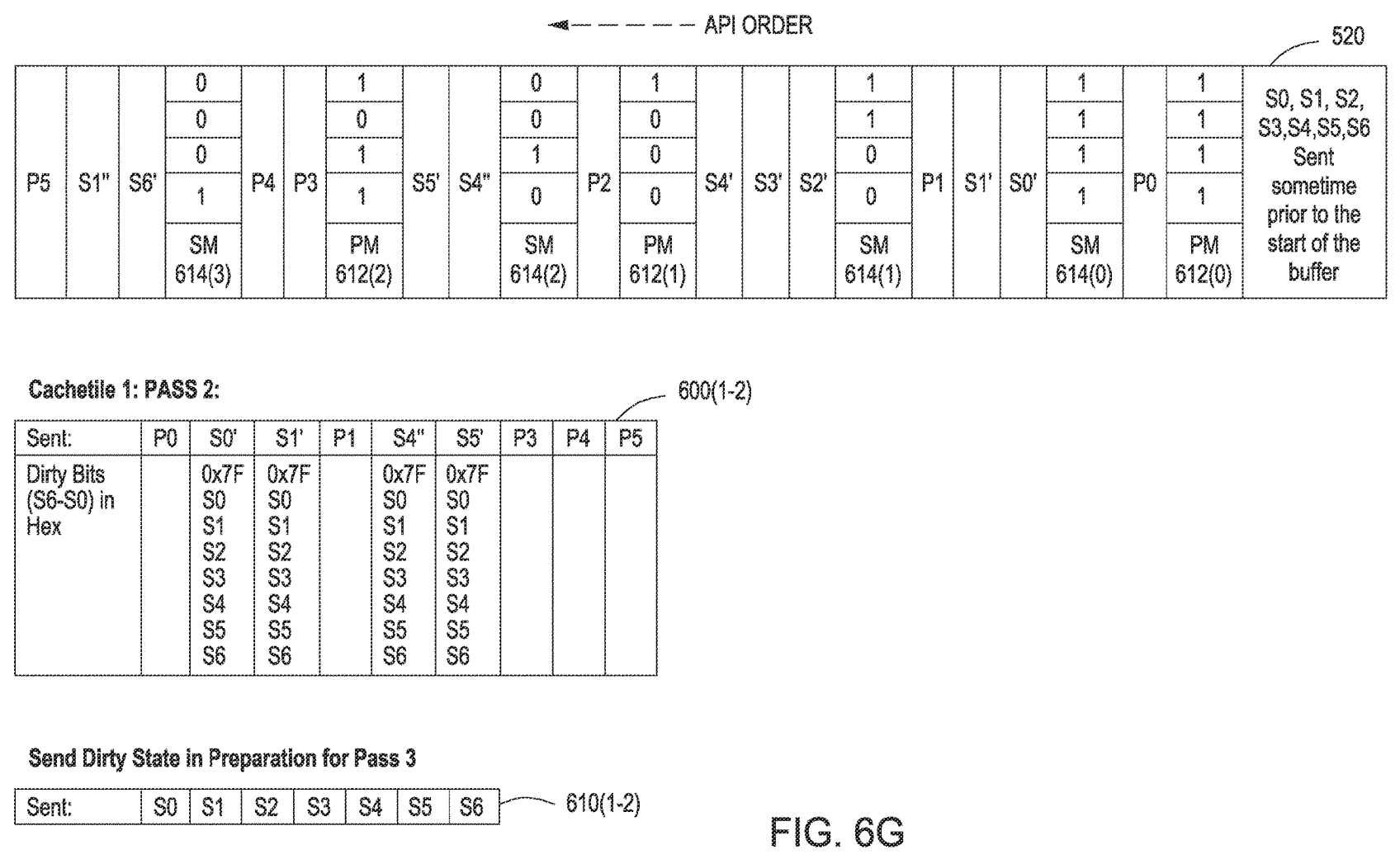

FIGS. 6A-6H are exemplary illustrations of how the multi-pass (MP) unit of FIG. 5 generates pass data for configuring the screen space pipeline of FIG. 3B, according to one embodiment of the present invention. Each of FIGS. 6A-6H illustrates exemplary data that is associated with one of four exemplary passes performed with one of two exemplary cache tiles. In particular, FIG. 6A illustrates data processed in pass 0 of cache tile 0. FIG. 6B illustrates data processed in pass 1 of cache tile 0. FIG. 6C illustrates data processed in pass 2 of cache tile 0. FIG. 6D illustrates data processed in pass 3 of cache tile 0. FIG. 6E illustrates data processed in pass 0 of cache tile 1. FIG. 6F illustrates data processed in pass 1 of cache tile 1. FIG. 6G illustrates data processed in pass 2 of cache tile 1. FIG. 6H illustrates data processed in pass 3 of cache tile 1.

As shown in each of FIGS. 6A-6H, buffer 520 includes primitive masks (PMs) 612, state masks (SMs) 614, various primitives, and various state settings, disposed within buffer 520 according to API order. As also, shown, various state settings S0, S1, S2, S3, S4, S5, and S6 were applied to screen space pipeline 354 previously. In the example described in conjunction with these figures, modified versions of these state settings are shown as, for example, S0', S0'', S0'''.

Each PM 612 is associated with a subset of primitives, and each SM 614 is associated with a subset of state settings. For example, PM 612(0) is associated with primitive P0. SM 614(0) is associated with state settings S0' and S1', which, again, reflect modified versions of state settings S0 and S1. Each primitive is generally associated with the most recent primitive mask. For example, primitive P1 is associated with PM 612(0). Each group of state settings and associated state mask may form a state bundle, such as the various SBs shown in FIG. 5. For example, SM 614(1) and state settings S2', S3', and S4' may form a state bundle.

Generally, the state mask for a given state bundle indicates the particular passes for which the associated state settings are relevant. Likewise, the primitive mask associated with a particular subset of primitives indicates the passes during which that subset of primitives should be processed. For example, SM 614(0) indicates that state settings S1' and S0' are applicable to all passes, since SM 614(0) has all bits set to one. Likewise, PM 612(0) indicates that primitive P0 should be processed in all passes, since PM 612(0) has all bits set to one.

Each of FIGS. 6A-6H also illustrates different pipeline data 600 and dirty state 610. A particular pipeline data 600 indicates the specific primitives and state settings transmitted to screen space pipeline 354 for a particular pass of a particular cache tile. Each dirty state 610 illustrates state settings that are sent, following the completion of a current pass, in order to prepare for a subsequent pass of given cache tile. FIGS. 6A-6H will now be described individually.

As shown in FIG. 6A, pipeline data 600(0-0) includes data that is sent to screen space pipeline 354 in conjunction with performing pass 0 of cache tile 0. Pipeline data 600(0-0) also illustrates dirty bits that are set in order to track which state settings deviated from previously configured values. In pipeline data 600(0-0), modified state settings S0', S1', S2', S3', and S4' are sent, and so these changes are recorded in corresponding dirty bits. When pass 0 of cache tile 0 is complete, MP unit 510 transmits dirty state 610(0-0), which includes state settings S0, S1, S2, S3, and S4, in order to prepare screen space pipeline 354 for pass 1 of cache tile 0.

As shown in FIG. 6B, pipeline data 600(0-1) includes data that is sent to screen space pipeline 354 in conjunction with performing pass 1 of cache tile 0. Pipeline data 600(0-1) also illustrates dirty bits that are set in order to track which state settings deviated from previously configured values. In pipeline data 600(0-1), state settings S0, S1, S2, S3, and S4 were modified to S0', S1', S2', S3', and S4', and so these changes are recorded in corresponding dirty bits. Since no primitives were sent after S2', S3' and S4', that state is not sent to screen space pipeline 354. Instead, the updated state is held in memory until the next primitive is sent or the pass ends. When pass 1 of cache tile 0 is complete, MP unit 510 transmits dirty state 610(0-1), which includes state settings S0, S1, S2, S3, and S4, in order to prepare screen space pipeline 354 for pass 2 of cache tile 0.

As shown in FIG. 6C, pipeline data 600(0-2) includes data that is sent to screen space pipeline 354 in conjunction with performing pass 2 of cache tile 0. Pipeline data 600(0-2) also illustrates dirty bits that are set in order to track which state settings deviated from previously configured values. In pipeline data 600(0-2), modified state settings S0', S1', S4'', and S5' are sent, and so these changes are recorded in corresponding dirty bits. State settings S2 is sent because the dirty bit is still set; however, state setting S2 was not changed in pass 2, so the last value sent was S2 (not S2'). In one embodiment, MP unit 510 implements a filtering mechanism to filter state settings when the associated value has not changed. Thus, although S2 is sent out of MP unit 510 during the preparation for pass 3, the filtering mechanism prevents S2 from being sent to screen space pipeline 354 again because the value has not changed. When pass 2 of cache tile 0 is complete, MP unit 510 transmits dirty state 610(0-2), which includes state settings S0, S1, S2, S3, S4, and S5 in order to prepare screen space pipeline 354 for pass 3 of cache tile 0.

As shown in FIG. 6D, pipeline data 600(0-3) includes data that is sent to screen space pipeline 354 in conjunction with performing pass 3 of cache tile 0. Pipeline data 600 (0-3) also illustrates dirty bits that are set in order to track which state settings deviated from previously configured values. In pipeline data 600(0-3), modified state settings S0', S1', S4'', S5', S6', and S1'' are sent, and so these changes are recorded in corresponding dirty bits. When pass 3 of cache tile 0 is complete, MP unit 510 transmits dirty state 610(0-3), which includes state settings S0, S1, S2, S3, S4, S5, and S6 in order to prepare screen space pipeline 354 for pass 0 of cache tile 1. When the above-mentioned filtering mechanism is applied, state settings S2 and S3 will be filtered and not sent to screen space pipeline 354 since these settings were not updated as part of the previous pass.

As shown in FIG. 6E, pipeline data 600(1-0) includes data that is sent to screen space pipeline 354 in conjunction with performing pass 0 of cache tile 1. Pipeline data 600(1-0) also illustrates dirty bits that are set in order to track which state settings deviated from previously configured values. In pipeline data 600(1-0), modified state settings S0', S1', S2', S3', and S4' are sent, and so these changes are recorded in corresponding dirty bits. When pass 0 of cache tile 1 is complete, MP unit 510 transmits dirty state 610(1-0), which includes state settings S0, S1, S2, S3, S4, S5, and S6 in order to prepare screen space pipeline 354 for pass 1 of cache tile 1. When the above-mentioned filtering mechanism is applied, state settings S5 and S6 will be filtered and not sent to screen space pipeline 354 since these settings were not updated as part of the previous pass.

As shown in FIG. 6F, pipeline data 600(1-1) includes data that is sent to screen space pipeline 354 in conjunction with performing pass 1 of cache tile 1. Pipeline data 600(1-1) also illustrates dirty bits that are set in order to track which state settings deviated from previously configured values. In pipeline data 600(1-1), modified state settings S0', S1', S2', S3', and S4' are sent, and so these changes are recorded in corresponding dirty bits. When pass 1 of cache tile 1 is complete, MP unit 510 transmits dirty state 610(1-1), which includes state settings S0, S1, S2, S3, S4, S5, and S6 in order to prepare screen space pipeline 354 for pass 2 of cache tile 1. When the above-mentioned filtering mechanism is applied, state settings S5 and S6 will be filtered and not sent to screen space pipeline 354 since these settings were not updated as part of the previous pass.

As shown in FIG. 6G, pipeline data 600(1-2) includes data that is sent to screen space pipeline 354 in conjunction with performing pass 2 of cache tile 1. Pipeline data 600 (1-2) also illustrates dirty bits that are set in order to track which state settings deviated from previously configured values. In pipeline data 600(1-2), modified state settings S0', S1', S4", and S5' are sent, and so these changes are recorded in corresponding dirty bits. When pass 2 of cache tile 1 is complete, MP unit 510 transmits dirty state 610(1-2), which includes state settings S0, S1, S2, S3, S4, S5, and S6 in order to prepare screen space pipeline 354 for pass 3 of cache tile 1. When the above-mentioned filtering mechanism is applied, state settings S2, S3, and S6 will be filtered and not sent to screen space pipeline 354 since these settings were not updated as part of the previous pass.

As shown in FIG. 6H, pipeline data 600(1-3) includes data that is sent to screen space pipeline 354 in conjunction with performing pass 3 of cache tile 1. Pipeline data 600 (1-3) also illustrates dirty bits that are set in order to track which state settings deviated from previously configured values. In pipeline data 600(1-3), modified state settings S0', S1', S4", S5', S6', and S1" are sent, and so these changes are recorded in corresponding dirty bits. At the end of the last pass for the last cache tile, the dirty bit can be cleared for any state setting with all bits of the associated state mask set. In this example, following pass 3 of cache tile 1, the dirty bits will be 0x7E (in hex), meaning S1, S2, S3, S4, S5 and S6 do not have the same value for all four passes and will have to be set up per pass on a subsequent replay. The starting values for each of the four passes are shown in FIG. 6H.

In this fashion, MP unit 510 tracks which state settings change between passes, and then only transmits updated state settings when needed. This approach may increase throughput of screen space pipeline 354 because less configuration is needed between passes. The techniques described thus far in FIGS. 6A-6H are also described in stepwise fashion below in conjunction with FIGS. 7 and 8, respectively.

Figure 7:
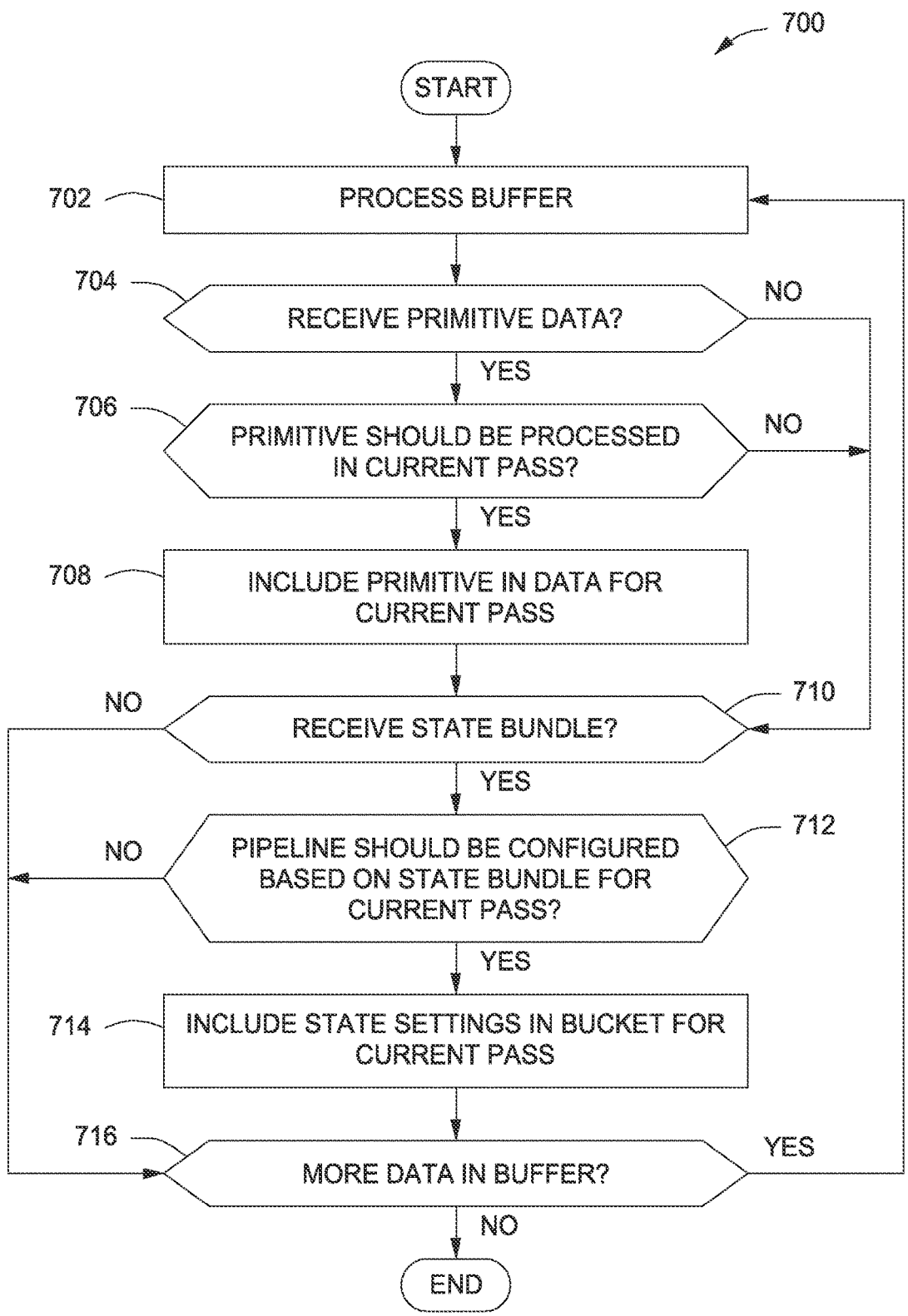
FIG. 7 is a flow diagram of method steps for performing multiple passes within a graphics processing pipeline, according to one embodiment of the present invention.

FIG. 7 is a flow diagram of method steps for performing multiple passes within a graphics processing pipeline, according to one embodiment of the present invention. Although the method steps are described in conjunction with the systems of FIGS. 1-6B, persons skilled in the art will understand that any system configured to perform the method steps, in any order, is within the scope of the present invention.

As shown, a method 700 begins at step 702, where MP unit 510 initiates the processing of buffer 520. In doing so, MP unit 510 begins traversing the data stored in buffer 520 and receives primitive data and state bundles. At step 704, MP unit 510 determines whether primitive data is received. Primitive data generally includes data or indices associated with a graphics primitive, and a primitive mask indicating in which passes the primitive should be processed. If primitive data is not received at step 704, then the method 700 proceeds to step 710, described below. Otherwise, the method 700 proceeds to step 706.

At step 706, MP unit 510 compares pass mask 512 to a primitive mask included in the primitive data to determine whether the associated graphics primitive should be processed in the current pass. If the comparison indicates that the primitive should not be processed in the current pass, then the method 700 proceeds to step 710, described below. Otherwise, the method 700 proceeds to step 708. At step 708, MP unit 510 includes the primitive associated with the primitive data in pass data 630 for the current pass. The method 700 then proceeds to step 710.

At step 710, MP unit 510 determines whether a state bundle is received. State bundles generally include one or more state settings and a state mask indicating which passes should be configured according to those one or more state settings. If a state bundle is not received at step 710, then the method proceeds to step 716, described below. If MP unit 510 determines at step 710 that a state bundle is received, then the method 700 proceeds to step 712.

At step 712, MP unit 510 compares pass mask 512 to a state mask included in the state bundle to determine whether the one or more state settings included in the state bundle should be used to configure screen space pipeline 354 for the current pass. If the comparison indicates that screen space pipeline 354 should not be configured based on those state settings, then the method proceeds to step 716, described below. Otherwise, the method 700 proceeds to step 714. At step 714, MP unit 510 includes the one or more state settings in pass data 630 for the current pass. The method 700 then proceeds to step 716.

At step 716, MP unit 510 determines whether the traversal of buffer 520 is complete. If that traversal is complete, then the method 700 ends. Otherwise, the method 700 returns to step 702 and continues processing buffer 520.

The method 700 may be performed one or more times for each pass through the screen space pipeline. In conjunction with performing the method 700, MP unit 510 may also perform another technique for tracking which state settings need to be resent for subsequent passes, as described in greater detail below in conjunction with FIG. 8.

Figure 8:
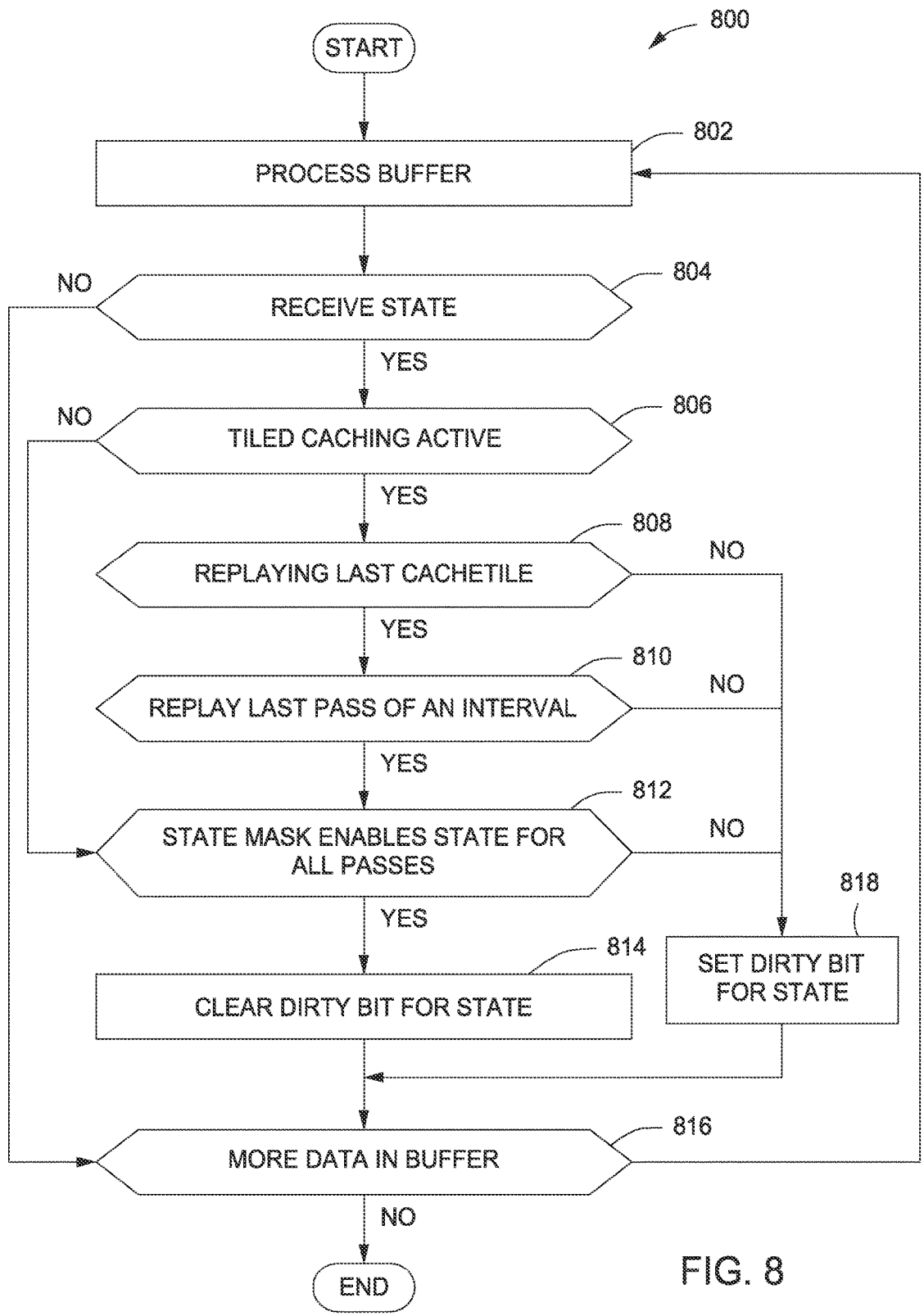
FIG. 8 is a flow diagram of method steps for preserving the state of a graphics processing pipeline across multiple passes, according to one embodiment of the present invention.

FIG. 8 is a flow diagram of method steps for preserving the state of a graphics processing pipeline across multiple passes, according to one embodiment of the present invention. Although the method steps are described in conjunction with the systems of FIGS. 1-6B, persons skilled in the art will understand that any system configured to perform the method steps, in any order, is within the scope of the present invention.

As shown, a method 800 begins at step 802, where MP unit 510 begins processing buffer 520. At step 804, MP unit 510 determines whether any state settings are received from buffer 520. If state settings are not received, then the method 800 proceeds to step 816, where MP unit 510 determines whether additional data is resident in buffer 520. If more data is, in fact included in buffer 520, then the method 800 returns to step 802.

If, at step 804, state settings are received from buffer 520, then the method 800 proceeds to step 806, where MP unit 510 determines whether tiled caching is active. If tiled caching is not active, then the method 800 skips steps 808 and 810 and proceeds to step 812. Otherwise, the method 800 proceeds to step 808, where MP unit 510 determines whether the last cache tile is being replayed. If the last cache tile is not being replayed, then the method 800 proceeds to step 818. Otherwise, the method 800 proceeds to step 810. At step 810, MP unit 510 determines whether the last pass of the interval is being replayed. If the last pass is not being replayed, the method 800 proceeds to step 818. Otherwise, the method 800 proceeds to step 812. At step 812, MP unit 510 determines whether the state mask enables state for all passes. If the state mask does, in fact, enable state for all passes, then the method 800 proceeds to step 814. At step 814, MP unit 510 clears the dirty bit for the affected state. If, at step 812, the state mask does not enable state for all passes, then the method 800 proceeds to step 818, where the dirty bit is set for the affected state. The method then proceeds to step 816 and proceeds as described above. When no additional data is found in buffer 520, the method 800 completes.

MP unit 510 may perform the method 800 in order to track which state settings change between passes. MP unit 510 may thus operate to restore the overall state of screen space pipeline 354 to the initial state needed for each separate pass. With this approach, MP unit 510 can conserve resources by avoiding reconfiguring the screen space pipeline 354 unless needed. The techniques described thus far may also be adapted to perform multiple passes for portions of buffer 520, and then later perform multiple passes for other portions of buffer 520. This approach may be valuable for certain graphics scenes that involves transparent layers that modify the Z buffer, as described in greater detail below in conjunction with FIGS. 9-11.

Multi-Pass Rendering Across Multiple Interval Boundaries

Figure 9:
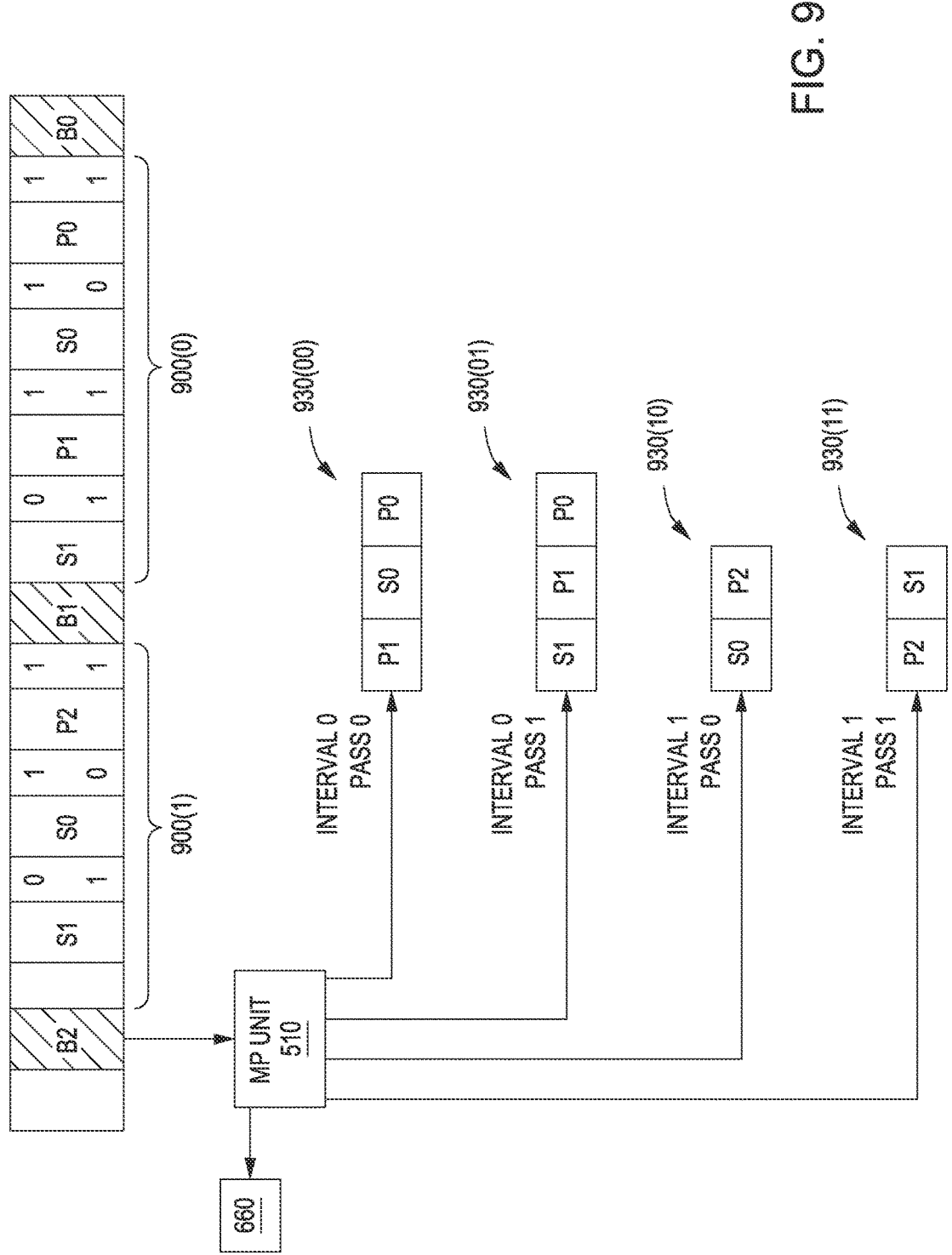
FIG. 9 is a conceptual illustration of how the MP unit of FIG. 5 configures the screen space pipeline of FIG. 3B to perform multiple passes, according to one embodiment of the present invention.

FIG. 9 is a conceptual illustration of how the MP unit of FIG. 5 configures the screen space pipeline of FIG. 3B to perform multiple passes, according to one embodiment of the present invention. In the example discussed herein, MP unit 510 is configured to perform two passes.

As shown, MP unit 510 is configured to process buffer 920. Buffer 920 is generally analogous to buffer 520 shown in FIGS. 5-6B. However, buffer 920 is organized differently, and includes different data, compared to buffer 520. In particular, buffer 920 is divided into interval data 900(0) and 900(1). Interval data 900(0) resides between interval boundaries B0 and B1. Interval data 900(1) resides between interval boundaries B1 and B2. Each interval data 900 includes primitive data having 2-bit primitive masks, and state bundles having 2-bit state masks, as is shown.

For each set of interval data 900, MP unit 510 processes the included primitive data and state settings, with one or more passes, to generate pass data 930. Pass data 930 includes primitives and state settings derived from buffer 520. Each different set of pass data 930 is associated with a different interval and a different pass. For a given interval and a given pass, screen space pipeline 354 processes the primitives in the associated pass data based on the corresponding state settings, in like fashion as described above in conjunction with FIGS. 6A-6H. Each of the passes performed by MP unit 510, for each interval, is described below.

For interval 0, pass 0, MP unit 510 generates pass data 930(00) that includes primitives P0 and P1 and state setting S0 In doing so, MP unit 510 parses the primitives and state settings from between boundaries B0 and B1 that are applicable to pass 0. MP unit 510 may then configure screen space pipeline 354 based on the extracted state settings, and cause the configured screen space pipeline 354 to process the extracted primitives.

For interval 0, pass 1, MP unit 510 generates pass data 930(01) that includes primitives P0 and P1 and state settings S1. In doing so, MP unit 510 parses the primitives and state settings from between boundaries B0 and B1 that are applicable to pass 1. MP unit 510 may then configure screen space pipeline 354 based on the extracted state settings, and cause the configured screen space pipeline 354 to process the extracted primitives.

When pass 1 of interval 0 is complete, MP unit 510 may then proceed to interval 1 and process interval data 900(1). However, prior to doing so, MP unit 510 restores the state settings of screen space pipeline 354 to those needed for pass 0. MP unit 510 may rely on a similar approach as that described above in conjunction with FIGS. 6A-6H to restore those settings. Once screen space pipeline 354 is configured for pass 0, MP unit 510 may then proceed to interval 1.

For interval 1, pass 0, MP unit 510 generates pass data 930(10) that includes primitive P2 and state setting S0. In doing so, MP unit 510 parses the primitives and state settings from between boundaries B1 and B2 that are applicable to pass 0. MP unit 510 may then configure screen space pipeline 354 based on the extracted state settings, and cause the configured screen space pipeline 354 to process the extracted primitives.

For interval 1, pass 1, MP unit 510 generates pass data 930(11) that includes primitive P2 and state setting S1. In doing so, MP unit 510 parses the primitives and state settings from between boundaries B1 and B2 that are applicable to pass 1. MP unit 510 may then configure screen space pipeline 354 based on the extracted state settings, and cause the configured screen space pipeline 354 to process the extracted primitives.

When pass 1 of interval 1 is complete, MP unit 510 may then move on to a subsequent tile, and therefore process different primitive data and state settings within buffer 920. However, prior to doing so, MP unit 510 restores the state settings of screen space pipeline 354 to those needed for pass 0 at the beginning of a tile. MP unit 510 may rely on a similar approach as that described above in conjunction with FIGS. 6A-6H to restore those settings. Specifically, MP unit 510 may maintain dirty bits that indicate which state settings need to be resent in preparation for a new tile. Once screen space pipeline 354 is configured for the next tile, MP unit 510 may then proceed to interval 0, pass 0 for that tile.

The approach described herein may be applied in graphics scenes that involve complex layers of transparency in order to cause the processing of certain layers to be completed before moving on to the processing of other layers. An exemplary graphics scene where the techniques described herein may be effectively applied is described in greater detail below in conjunction with FIG. 10.

Figure 10:
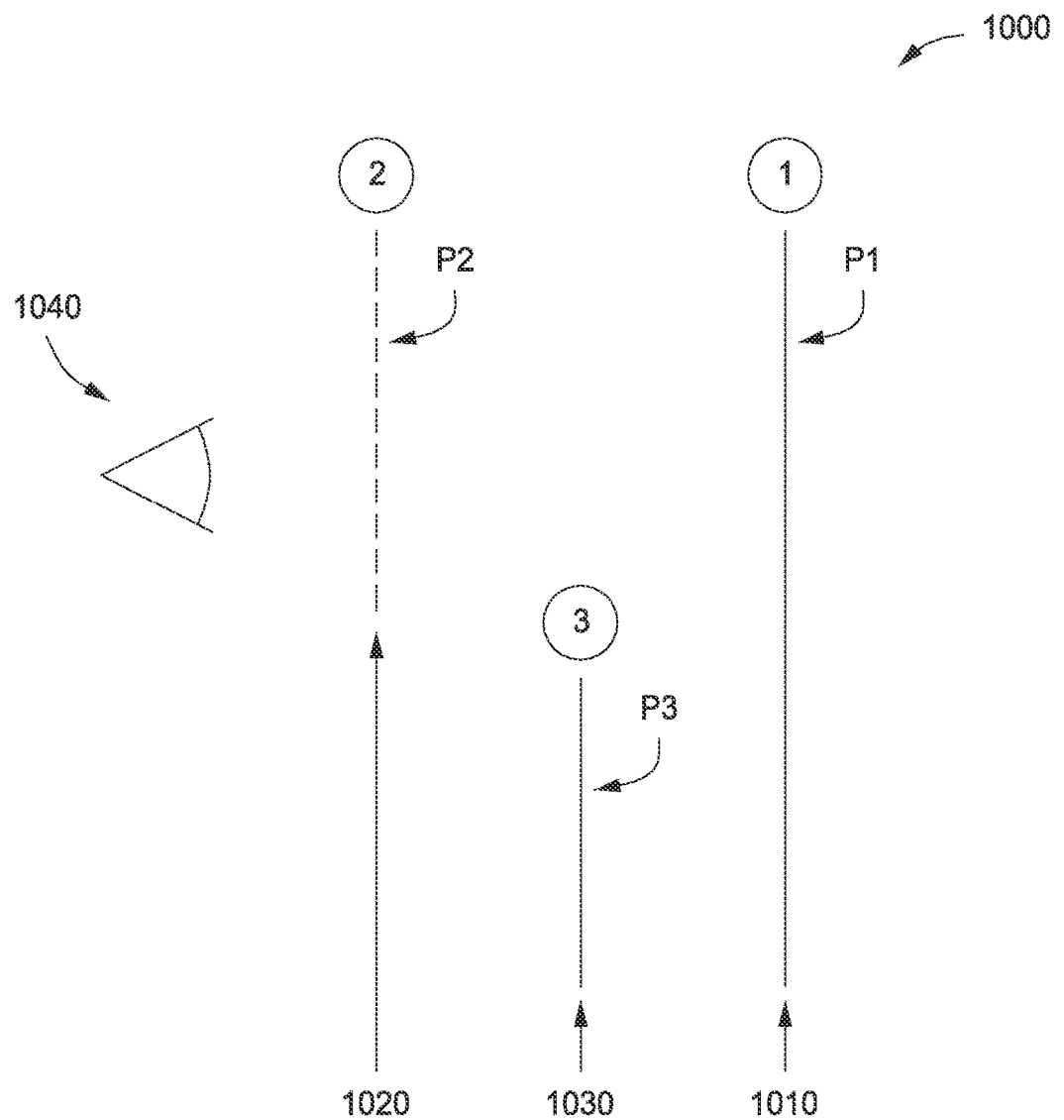
FIG. 10 is a conceptual illustration of how the operations performed by the MP unit of FIG. 5 may improve rendering efficiency and accuracy, according to one embodiment of the present invention.

FIG. 10 is a conceptual illustration of how the operations performed by the MP unit of FIG. 5 may improve rendering efficiency and accuracy, according to one embodiment of the present invention. In particular, MP unit 510 is configured to separate the rendering of specific sets of primitives into different intervals in order to support proper rendering of those primitives. This functionality may be implemented in a wide variety of different rendering situations. One such exemplary situation is described below. In this example, MP unit 510 separates the rendering of primitives when multiple opaque and transparent layers are rendered together.

As shown, a graphics scene 1000 includes layers 1010, 1020, and 1030 of geometry. Layer 1010 is an opaque layer that includes a set of opaque primitives represented by P1, layer 1020 is a transparent layer that includes a set of transparent primitives represented by P2, and layer 1030 is an opaque layer that includes a set of opaque primitives represented by P3. The primitives within the layers of graphics scene 1000 are rendered from viewing position 1040 in application programming interface (API) order. Primitives P1 of layer 1010 are rendered first, primitives P2 of layer 1020 are rendered second, and primitives P3 of layer 1030 are rendered last. In the exemplary scenario discussed herein, the rendering of primitives P2 within layer 1020 involves updating Z.

If primitives P2 of layer 1020 were to be rendered together with primitives P1 of layer 1010 in the same interval, then primitives P2 could be rendered incorrectly. Specifically, because the rendering of primitives P2 involves updating Z, and those primitives occlude some of primitives P1 from the perspective of position 1040, the occluded primitives in layer 1010 would not be rendered. Consequently, primitives P2 would not be blended within the occluded primitives of layer 1010. Thus, although layer 1020 is transparent and should show some degree of blending with layer 1010, this blending would be absent.

However, to avoid problems such as these, device driver 103 configures MP unit 510 to separate the rendering of layers 1010, 1020, and 1030 into three different intervals. Primitives P1, P2, and P3 would therefore be subject to different Z-passes associated with those different intervals, and the occluded primitives within layer 1010 would not be discarded in favor of the primitives of layer 1020. Primitives P1 within layer 1010 would be rendered in a first interval, primitives P2 in layer 1020 would be rendered in a second interval, and primitives P3 in layer 1030 would be rendered in a third interval. Thus, when processing primitives P2 in the second interval, screen space pipeline 354 would render primitives P2 within layer 1020 to show proper blending with primitives P1 within layer 1010, since primitives P1 were already rendered in the previous interval.

As a general matter, device driver 103 may detect situations when intervals are needed and then configure MP unit 510 accordingly. In doing so, device driver 103 may track state used by an application that create layers of primitives, and then determine when those layers alternate between transparent layers that involve writing to Z and opaque layers. Device driver 103 may then configure MP unit 510 to separate the transparent and opaque layers into different intervals. In detecting transparent layers, device driver 103 may check for alpha blending transparency, determine whether a fragment shader discards pixels, identify when Z-pass pixel count is enabled, and identify various other conditions to determine that one or more intervals may be needed.

The advantage of the technique described herein by way of example is that MP unit 510 need not flush buffer 520 between opaque and transparent layers in order to preserve proper rendering. Thus, primitives within the graphics scene may be binned deeply, thereby improving performance.

Persons skilled in the art will understand that the example discussed herein is meant only to convey one exemplary situation where separating the processing of primitives across intervals may be advantageous. As a general matter, the technique described above in conjunction with FIG. 9 may be applied in a wide variety of different scenarios to improve rendering. That technique is described in stepwise fashion below in conjunction with FIG. 11.

Figure 11:
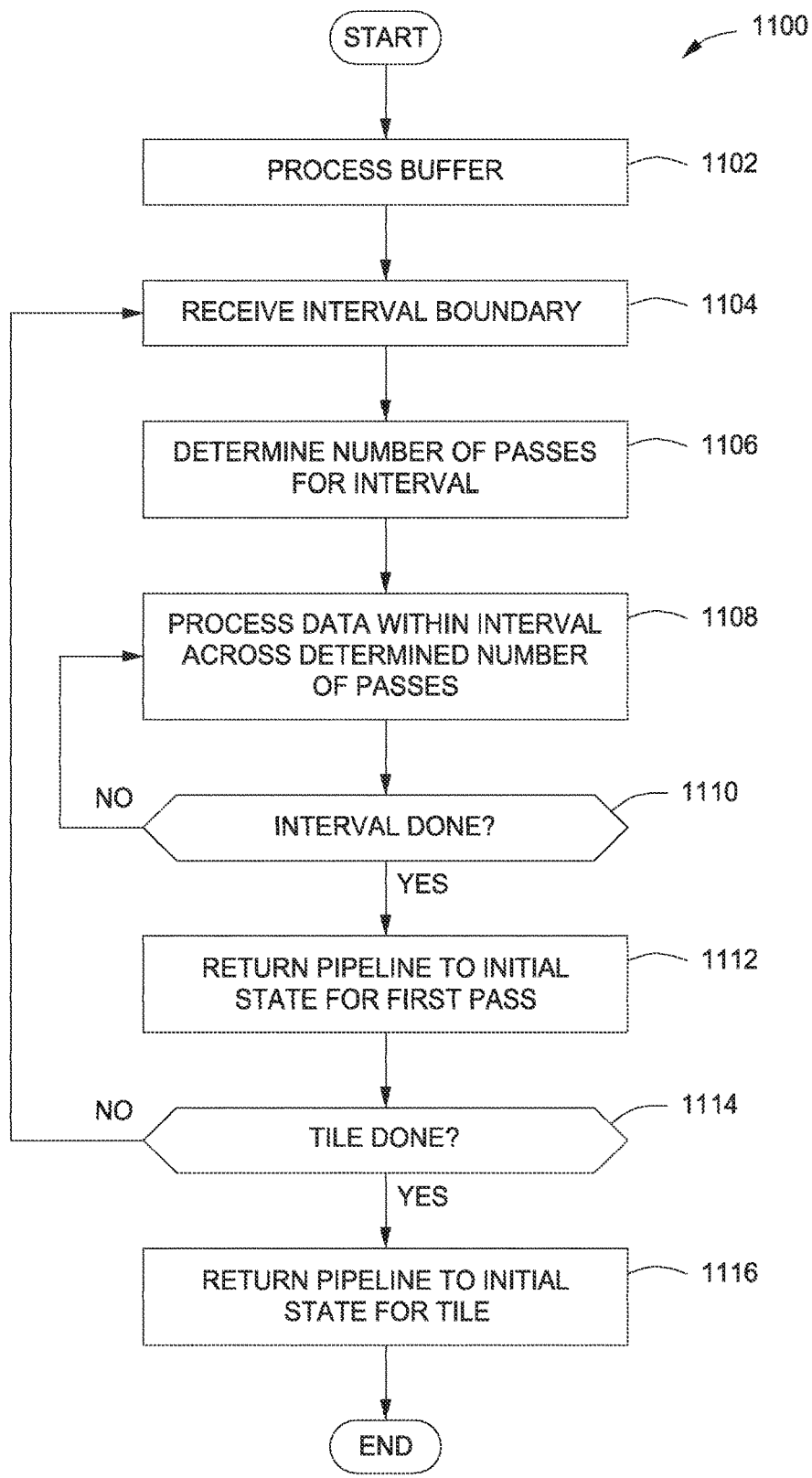
FIG. 11 is a flow diagram of method steps for configuring a graphics processing pipeline to perform multiple passes in multiple intervals, according to one embodiment of the present invention.

FIG. 11 is a flow diagram of method steps for configuring a graphics processing pipeline to perform multiple passes in multiple intervals, according to one embodiment of the present invention. Although the method steps are described in conjunction with the systems of FIGS. 1-6B and 9-10, persons skilled in the art will understand that any system configured to perform the method steps, in any order, is within the scope of the present invention.

As shown, a method 1100 begins at step 1102, where MP unit 510 initiates the processing of buffer 920. Buffer 920 includes primitive data and state bundles, similar to buffer 520 of FIG. 5. Buffer 920 also includes interval boundaries, as described above in conjunction with FIG. 9. At step 1104, MP unit 510 receives an interval boundary. At step 1106, MP unit 510 determines, based on the interval boundary, the number of passes through screen space pipeline 354 to be performed. At step 1108, MP unit 510 configures screen space pipeline 354, for each pass in the interval, to process the graphics primitives within that interval. In performing the multiple passes, MP unit 510 relies on a similar technique a described in conjunction with FIGS. 6A-6H.

At step 1110, MP unit 510 determines whether the current interval is complete. If the interval is not complete, the method 1100 returns to step 1108. If the interval is complete, meaning that all primitives in the interval have been processed across the indicated number of passes, then the method continues to step 1112.

At step 1112, MP unit 510 returns screen space pipeline 354 to the initial state associated with the first pass of the recently completed interval. Doing so readies the pipeline for subsequent intervals. MP unit 510 may rely on dirty bit register 660 in performing step 1112. At step 1114, MP unit 510 determines whether the current tile is complete. If the tile is not yet complete, then the method 1100 returns to step 1102 and proceeds with the next interval. Otherwise, the method 1100 proceeds to step 1116. At step 1116, MP unit 510 returns the screen space pipeline 354 to the initial state needed for processing a tile. MP unit 510 may rely on dirty bit register 660, or another set of dirty bits used for tracking the initial state of the tile, when performing step 1114.

Persons skilled in the art will recognize that the method 1100 may be implemented in conjunction with the methods 700 and 800 described above in conjunction with FIGS. 7 and 8, respectively. For example, the techniques performed in the method 700 may be applied to perform step 1108 of the method 1100. Likewise, the techniques performed in the method 800 may be applied to perform steps 1112 and/or 1116 of the method 1100.

The multi-pass techniques described above may be performed on some or all of the hardware within screen space pipeline 354. Further, some passes may need only a portion of screen space pipeline 254, while other passes may need only a different portion. For example, pixel shading operations may be performed on an SM 310 while various ROP operations occur within ROP 395. In order to implement such concurrent processing, graphics processing pipeline 350 may be configured in like fashion as described below in conjunction with FIGS. 12-13.

Parallel Execution of Passes

Figure 12:
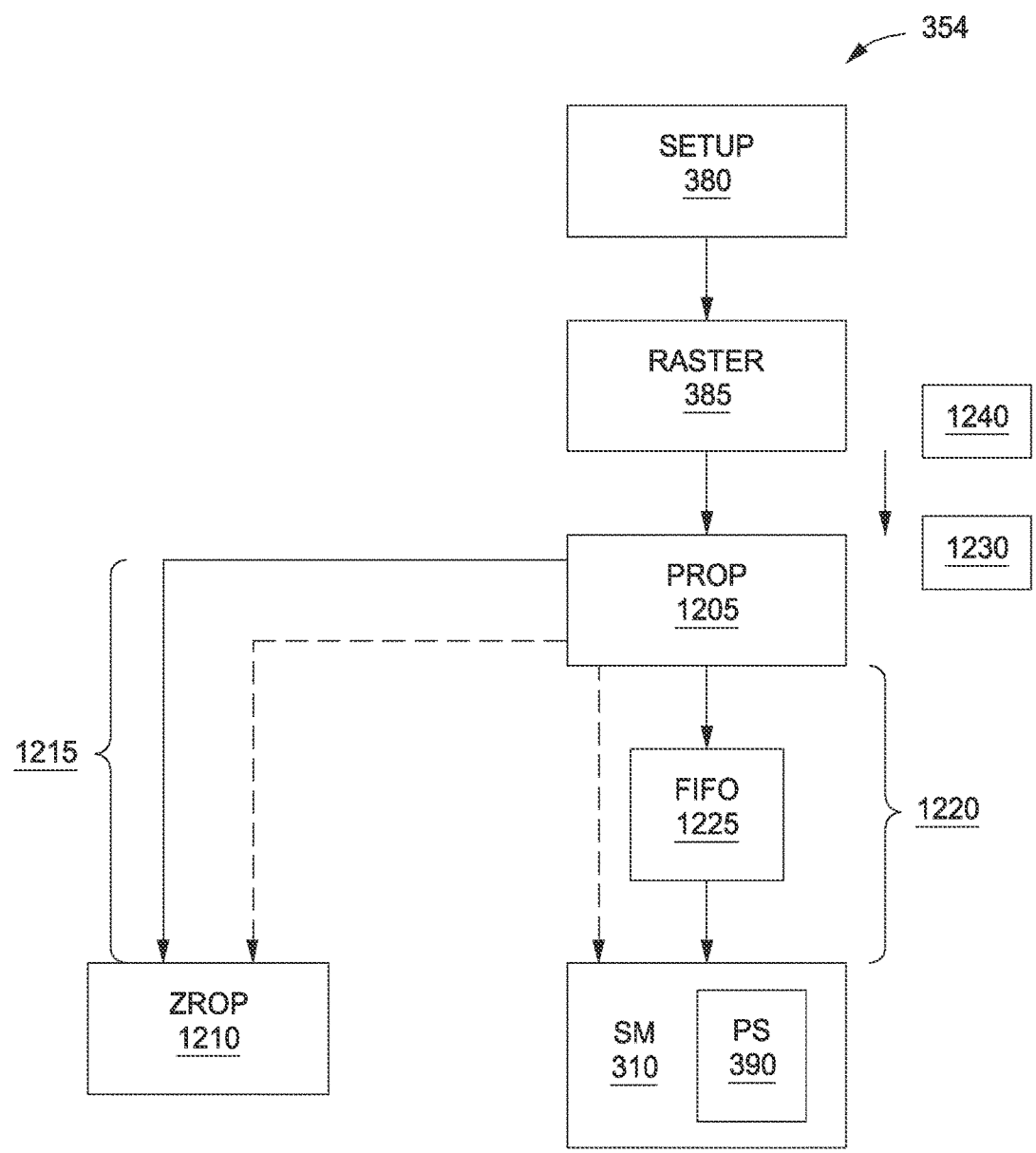
FIG. 12 illustrates a portion of the screen space pipeline of FIG. 3B configured to perform different passes involving different cache tiles simultaneously, according to one embodiment of the present invention.

FIG. 12 illustrates a portion of the screen space pipeline of FIG. 3B configured to perform different passes involving different cache tiles simultaneously, according to one embodiment of the present invention. As shown, screen space pipeline 354 includes setup 380, raster 385, PROP 1205, ZROP 1210, first-in/first-out (FIFO) 1225, and SM 310. PROP 1205 and ZROP 1210 may be included within ROP 395 of FIG. 3B. SM 310 is configured to execute pixel shader programs and may thus implement PS 390, also shown in FIG. 3B. PROP 1205 is coupled to ZROP 1210 via data pathway 1215. PROP 1205 is also coupled to SM 310 via data pathway 1220. FIFO 1225 resides within data pathway 1220.

Screen space pipeline 354 implements the multi-pass techniques discussed above in conjunction with FIGS. 5-11 to perform different passes on cache tiles. Certain types of passes rely on data pathway 1215, while other types of passes depend on data pathway 1220. For example, for types of passes that involve early Z work, PROP 1205 sends tile data to ZROP 1210 via data pathway 1215 for processing. However, for types of passes that involve color shading, PROP 1205 sends tile data to SM 310 via data pathway 1220 for processing.

Screen space pipeline 354 may transmit different tile data across data pathways 1215 and 1220 for simultaneous processing by ZROP 1210 and SM 310, respectively, thereby parallelizing certain types of passes. For example, suppose screen space pipeline 354 is configured to perform two passes on cache tiles, a Z only pass followed by a color pass. PROP 1205 could receive a tile 1230 and transmit that tile to ZROP 1210 via pathway 1215 for the early Z pass. When early Z processing is complete for tile 1230, PROP 1205 would then push the processed tile into FIFO 1225. PROP 1205 could then receive a tile 1240 and transmit that tile to ZROP 1210, via pathway 1215, for an early Z pass. While ZROP 1210 performs the early Z pass on tile 1240, SM 310 could drain FIFO 1225 and perform the color pass on tile 1230. This functionality may improve the speed with which screen space pipeline 354 can perform passes by utilizing multiple data pathways simultaneously, thereby hiding latencies potentially incurred by each such pathway.

Generally, FIFO 1225 is sized to accommodate all packets of data associated with an entire cache tile. Thus, PROP 1205 can store all of tile 1230 within FIFO 1225, and then reacquire sufficient memory resources to transmit some or all of tile 1240 to ZROP 1210. Lacking FIFO 1225, SM 310 may not be able to receive all packets of a given tile before the subsequent tile is received by PROP 1205. In the example discussed above, without FIFO 1225, PROP 1205 may not be able to transmit all of tile 1230 to SM 310 for the color pass. This could backpressure PROP 1205, and so the early Z processing of tile 1240 would be stalled, potentially serializing the screen space pipeline 254. However, implementing FIFO 1225 in the fashion described avoids this issue and allows different passes to be parallelized for different tiles. Persons skilled in the art will understand that various other types of passes may be parallelized in the manner described herein, beyond those which involve the specific hardware described, by way of example, above.

Screen space pipeline 354 is also configured to interoperate with device driver 103 to configure SM 310 on a per-pass basis. In particular, device driver 103 may configure pixel shaders executing on SM 310 to perform different types of shading operations depending on the current pass. This functionality may improve the efficiency of multi-pass configurations where late Z is activated during one pass, followed by color shading in a subsequent pass. In a conventional configuration, the pixel shader would perform color shading when executing late Z operations to compute visibility. However, in a multi-pass configuration, color shading need not be performed until the actual color shading pass.

Thus, device driver 103 may configure SM 310 to execute a lightweight shader program during late Z passes that only computes visibility and does not perform full color shading. The late Z pass may only affect the Z cull unit. Then, during subsequent color shading passes, device driver 103 may cause SM 310 to perform full-bore color shading. This approach may generally be applied to reduce color shading using a combination of Z pre-pass and Z cull.

Device driver 103 configures SM 310 to perform pass-dependent shading using state bundles. Device driver 103 may transmit a state bundle to SM 310 that indicates one or more passes and configuration data that is relevant to those passes. SM 310 may then perform certain operations for the indicated passes, based on the included configuration data. For example, device driver 103 could transmits a state bundle indicating that, during a first pass, SM 310 should only compute visibility and refrain from performing heavy color shading work. Then, a subsequent state bundle could indicate a particular shader program SM 310 should execute during a second pass. SM 310 is configured to read the data within the received state bundles and then perform the relevant operation. In one embodiment, device driver 103 transmits state bundles to SM 310 that include a state mask similar to those described above in conjunction with FIGS. 5-11. The included state mask indicates to which passes the configuration data is relevant in the manner described previously.

Figure 13:
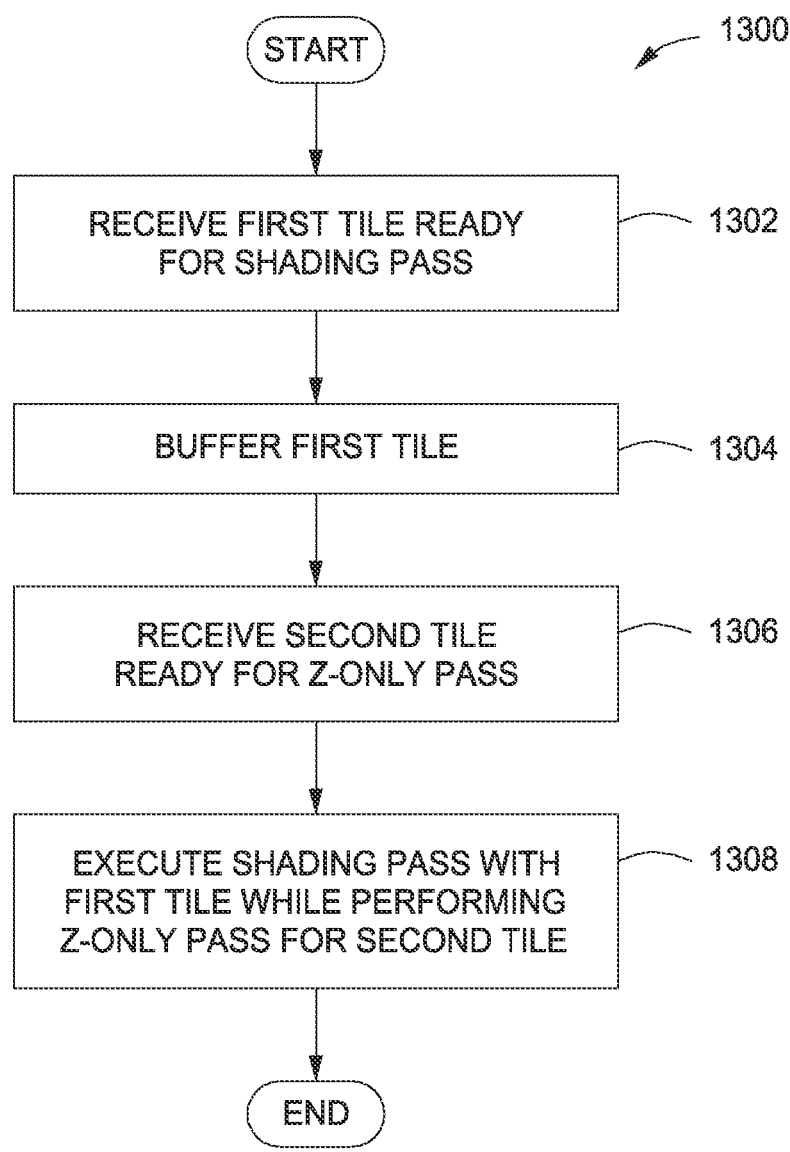
FIG. 13 is a flow diagram of method steps for processing multiple cache tiles concurrently, according to one embodiment of the present invention.

FIG. 13 is a flow diagram of method steps for processing multiple cache tiles concurrently, according to one embodiment of the present invention. Although the method steps are described in conjunction with the systems of FIGS. 1-6H, 9-10, and 12, persons skilled in the art will understand that any system configured to perform the method steps, in any order, is within the scope of the present invention.

As shown, a method 1300 begins at step 1302, where screen space pipeline 354 receives a first tile that is ready for a shading pass. Screen space pipeline 354 has already performed a previous Z only pass on the first tile using ZROP 1210. At step 1304, FIFO 1225 buffers the first tile. FIFO 1225 is generally sized to accommodate an entire cache tile, thereby removing burden of storing portions of that tile from PROP 1205. At step 1306, PROP 1205 receives a second tile that is ready for a Z only pass. PROP 1205 may then transmit the second tile to ZROP 1210 for processing. At step 1308, SM 310 executes a shading pass with the first tile while, simultaneously, ZROP 1210 executes a Z only pass with the second tile. The method 1300 then ends.

Screen space pipeline 1300 may implement the method 1300 in order to parallelize two otherwise serial tasks, thereby hiding latencies and accelerating the processing of tiles. The techniques described above may also be implemented in other contexts. As a general matter, any approach to parallelizing different passes in screen space pipeline 354 falls within the scope of the present invention.

Figure 14:
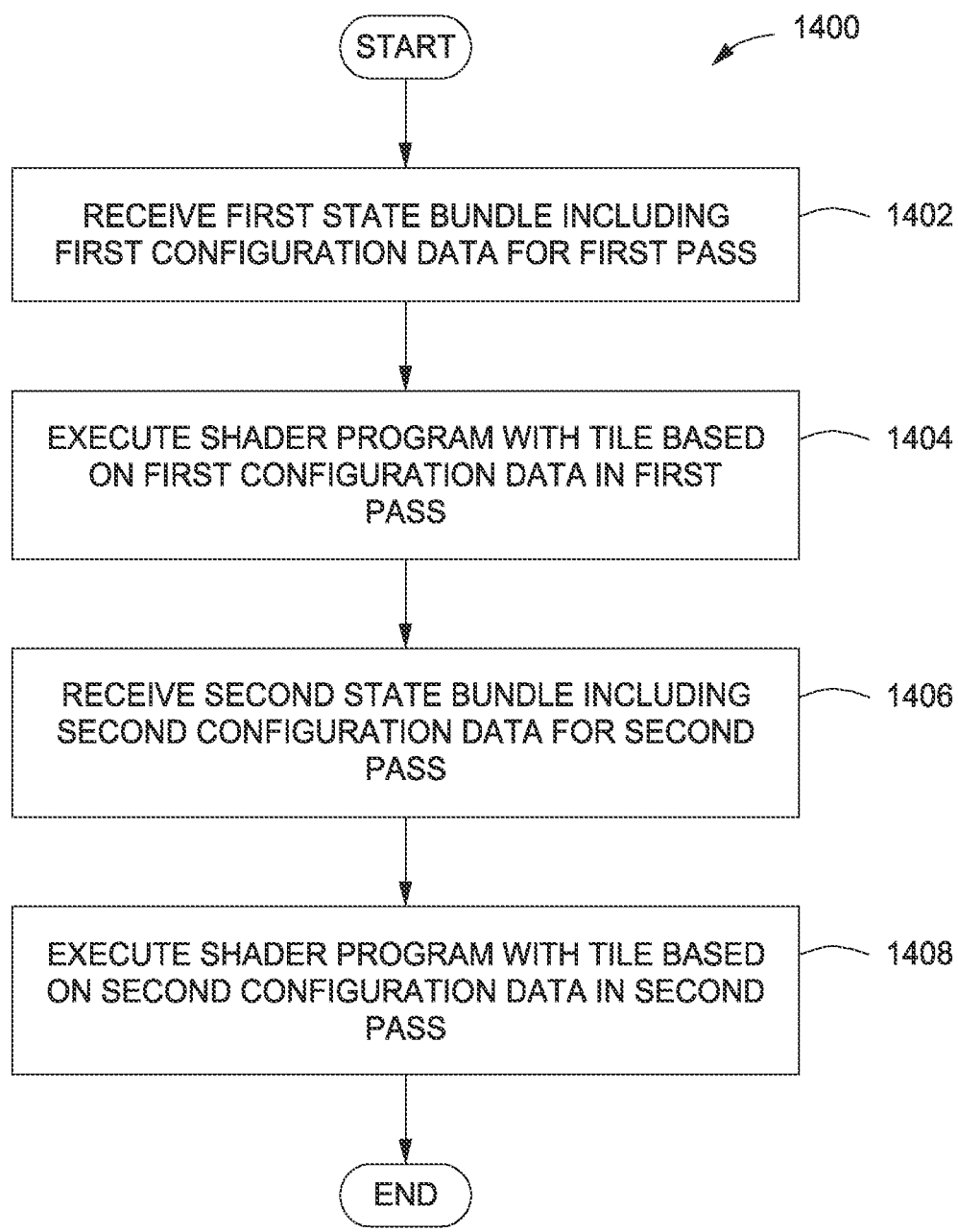
FIG. 14 is a flow diagram of method steps for performing pass-dependent color shading, according to one embodiment of the present invention.

FIG. 14 is a flow diagram of method steps for performing pass-dependent color shading, according to one embodiment of the present invention. Although the method steps are described in conjunction with the systems of FIGS. 1-6H, 9-10, and 12, persons skilled in the art will understand that any system configured to perform the method steps, in any order, is within the scope of the present invention.

As shown, a method 1400 begins at step 1402, where SM 310 receives a first state bundle from device driver 103 that includes first configuration data for a first pass. The first state bundle may include a state mask indicating that the first configuration data should be applied to the first pass. The first configuration data could be, for example, special values or program code, among other possibilities. The first pass may include visibility computations associated with late Z mode. At step 1404, SM 310 executes a shader program with a cache tile based on the first configuration for the first pass. In doing so, SM 310 may compute visibility data for the cache tile without performing color shading.

At step 1406, SM 310 receives a second state bundle from device driver 103 that includes second configuration data for a second pass. The second state bundle may include a state mask indicating that the second configuration data should be applied to the second pass. The second configuration data could be, for example, special values or program code, among other possibilities. The second pass may include color shading operations associated with late Z mode. At step 1408, SM 310 executes a shader program with the cache tile based on the second configuration for the second pass. In doing so, SM 310 may perform color shading operations with the cache tile.

The technique described above may be applied to reduce the amount of color shading needed when processing cache tiles. In particular, the method 1400 may be implemented to reduce color shading operations during passes that do not need significant color shading, and to only perform significant color shading operations for passes that involve heavy color shading operations. Persons skilled in the art will recognize that the methods 1300 and 1400 described above in conjunction with FIGS. 13 and 14, respectively, may be practiced in conjunction with one another to further improve the efficiency of screen space pipeline 354. For example, the method 1300 may be implemented to improve the efficiency with which first and second tiles are processed during first and second passes across those tiles that involve early Z work. Then, the method 1400 may be applied to improve the efficiency with which the first and second tiles are processing during third and fourth passes across those tiles that involve late Z work.

In sum, a multi-pass unit interoperates with a device driver to configure a screen space pipeline to perform multiple processing passes with buffered graphics primitives. The multi-pass unit receives primitive data and state bundles from the device driver. The primitive data includes a graphics primitive and a primitive mask. The primitive mask indicates the specific passes when the graphics primitive should be processed. The state bundles include one or more state settings and a state mask. The state mask indicates the specific passes where the state settings should be applied. For a given pass, the multi-pass unit extracts the state settings for that pass and then configures the screen space pipeline according to those state settings. The multi-pass unit also extracts the graphics primitives to be processed in that pass. Then, the multi-pass unit causes the configured screen space pipeline to process the extracted graphics primitives.

At least one advantage of the techniques described herein is that the screen space pipeline can be configured to perform various Z passes with buffered primitives and then subsequently perform color shading passes with those same buffered primitives. Thus, certain types of graphics scenes can be rendered correctly without the need to re-fetch graphics data from memory. These techniques may reduce power consumption and therefore improve battery life of mobile devices.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A graphics subsystem for processing graphics primitives, the subsystem comprising:
 a screen space pipeline configured to process graphics primitives in multiple passes; and
 a multi-pass unit that includes a buffer and is configured to:
  extract a first graphics primitive from a first portion of the buffer for processing in a first pass through the screen space pipeline, wherein a first primitive mask associated with the first graphics primitive indicates that the first graphics primitive is to be processed in the first pass; and
  extract the first graphics primitive from the first portion of the buffer for processing in a second pass through the screen space pipeline.

2. The graphics subsystem of claim 1, wherein the multi-pass unit further includes a pass mask that indicates a current pass in the multiple passes.

3. The graphics subsystem of claim 2, wherein the multi-pass unit extracts the first graphics primitive from the first portion of the buffer by:
 comparing a first bit of the pass mask to a corresponding first bit of the first primitive mask; and
 determining that the first bit and the corresponding first bit are both set,
 wherein the first bit indicates that the current pass is the first pass, and the corresponding first bit indicates that the first graphics primitive is to be processed in the first pass.

4. The graphics subsystem of claim 3, wherein the multi-pass unit extracts the first graphics primitive from the first portion of the buffer for processing in the second pass by:
 comparing a second bit of the pass mask to a corresponding second bit of the first primitive mask; and
 determining that the second bit and the corresponding second bit are both set to one,
 wherein the second bit indicates that the current pass is the second pass, and the corresponding second bit indicates that the first graphics primitive is to be processed in the second pass.

5. The graphics subsystem of claim 2, wherein the buffer further includes a first state bundle that includes a first state mask and a first set of state settings for configuring the screen space pipeline, wherein the first state mask indicates one or more passes where the first set of state settings are to be applied when configuring the screen space pipeline for processing.

6. The graphics subsystem of claim 5, wherein the multi-pass unit is further configured to:
 extract the first state bundle from the buffer;
 determine that the first state mask indicates that the first set of state settings are to be applied when configuring the screen space pipeline for the first pass; and
 configure the screen space pipeline for the first pass based on the first set of state settings.

7. The graphics subsystem of claim 6, wherein the buffer further includes a second state bundle that includes a second state mask and a second set of state settings for configuring the screen space pipeline, wherein the second state mask indicates one or more passes where the second set of state settings are to be applied when configuring the screen space pipeline for processing.

8. The graphics subsystem of claim 7, wherein the multi-pass unit is further configured to:
 extract the second state bundle from the buffer;
 determine that the second state mask indicates that the second set of state settings are to be applied when configuring the screen space pipeline for the second pass; and
 configure the screen space pipeline for the second pass based on the second set of state settings.

9. The graphics subsystem of claim 1, wherein the first primitive mask further indicates that the first graphics primitive is to be processed in the first second pass through the screen space pipeline.

10. The graphics subsystem of claim 1, wherein the multi-pass unit is further configured to:
 configure the screen space pipeline for processing the first graphics primitive in the first pass;
 configure the screen space pipeline for processing the first graphics primitive in the second pass;
 configure the screen space pipeline for processing a second graphics primitive in an additional first pass; and
 configure the screen space pipeline for processing the second graphics primitive in an additional second pass.

11. The graphics subsystem of claim 10, wherein the multi-pass unit is further configured to:
 extract the second graphics primitive from a second portion of the buffer for processing in the additional first pass through the screen space pipeline, and
 extract the second graphics primitive from the second portion of the buffer for processing in the additional second pass through the screen space pipeline.

12. The graphics subsystem of claim 11, wherein the multi-pass unit includes a dirty bit register having a first dirty bit corresponding to an initial state associated with the screen space pipeline, wherein the screen space pipeline is configured for processing based on the initial state prior to the first pass and prior to the additional first pass.

13. A system for processing graphics primitives, the system comprising:
 a graphics processing pipeline, including:
  a screen space pipeline configured to process graphics primitives in multiple passes; and
  a multi-pass unit that includes a buffer and is configured to:
   extract a first graphics primitive from a first portion of the buffer for processing in a first pass through the screen space pipeline, wherein a first primitive mask associated with the first graphics primitive indicates that the first graphics primitive is to be processed in the first pass; and extract the first graphics primitive from the first portion of the buffer for processing in a second pass through the screen space pipeline.

14. The system of claim 13, wherein the multi-pass unit further includes a pass mask that indicates a current pass in the multiple passes.

15. The system of claim 14, wherein the multi-pass unit extracts the first graphics primitive from the first portion of the buffer by:

comparing a first bit of the pass mask to a corresponding first bit of the first primitive mask; and determining that the first bit and the corresponding first bit are both set, wherein the first bit indicates that the current pass is the first pass, and the corresponding first bit indicates that the first graphics primitive is to be processed in the first pass.

16. The system of claim 15, wherein the first primitive mask further indicates that the first graphics primitive is to be processed in a second pass through the screen space pipeline, and wherein the multi-pass unit extracts the first graphics primitive from the first portion of the buffer for processing in the second pass by:

comparing a second bit of the pass mask to a corresponding second bit of the first primitive mask; and determining that the second bit and the corresponding second bit are both set to one, wherein the second bit indicates that the current pass is the second pass, and the corresponding second bit indicates that the first graphics primitive is to be processed in the second pass.

17. The system of claim 16, wherein the buffer further includes a first state bundle that includes a first state mask and a first set of state settings for configuring the screen space pipeline for the first pass, and wherein the buffer further includes a second state bundle that includes a second state mask and a second set of state settings for configuring the screen space pipeline for a second pass.

18. The system of claim 17, wherein the multi-pass unit is further configured to:

extract the second state bundle from the buffer;

determine that the second state mask indicates that the second set of state settings are to be applied when configuring the screen space pipeline for the second pass; and configure the screen space pipeline for the second pass based on the second set of state settings.

19. A computer-implemented method for processing graphics primitives, the method comprising:

extracting a first graphics primitive from a first portion of a buffer for processing in a first pass through a screen space pipeline, wherein a first primitive mask associated with the first graphics primitive indicates that the first graphics primitive is to be processed in the first pass;

extracting the first graphics primitive from the first portion of the buffer for processing in a second pass through the screen space pipeline;

extracting a second graphics primitive from a second portion of the buffer for processing in an additional first pass through the screen space pipeline; and extracting the second graphics primitive from the second portion of the buffer for processing in an additional second pass through the screen space pipeline.

20. The computer-implemented method of claim 19, further comprising:

configuring the screen space pipeline for the first pass based on a first state bundle that includes a first set of state settings;

configuring the screen space pipeline for the second pass based on a second state bundle that includes a second set of state settings;

configuring the screen space pipeline for the additional first pass based on the first state bundle; and configuring the screen space pipeline for the additional second pass based on the second state bundle.

* * * * *

UNITED STATES PATENT AND TRADEMARK OFFICE
CERTIFICATE OF CORRECTION

| | |
|---|---|
| PATENT NO. | : 10,147,222 B2 |
| APPLICATION NO. | : 14/952390 |
| DATED | : December 4, 2018 |
| INVENTOR(S) | : Ziyad Hakura et al. |

It is certified that error appears in the above-identified patent and that said Letters Patent is hereby corrected as shown below:

In the Claims

Column 30, Claim 9, Line 30, please delete "first" before second.

Signed and Sealed this
Nineteenth Day of February, 2019

Andrei Iancu
*Director of the United States Patent and Trademark Office*